United States Patent
Watatsu et al.

(10) Patent No.: US 11,173,840 B2
(45) Date of Patent: Nov. 16, 2021

(54) ELECTRONIC MIRROR APPARATUS

(71) Applicant: TOYOTA JIDOSHA KABUSHIKI KAISHA, Toyota (JP)

(72) Inventors: Kohta Watatsu, Toyota (JP); Katsuji Gouzu, Toyota (JP); Tomoyuki Yoshida, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/174,897

(22) Filed: Oct. 30, 2018

(65) Prior Publication Data
US 2019/0135180 A1 May 9, 2019

(30) Foreign Application Priority Data
Nov. 8, 2017 (JP) .............................. JP2017-215349

(51) Int. Cl.
| | |
|---|---|
| *B60R 1/00* | (2006.01) |
| *B60R 1/12* | (2006.01) |
| *H04N 5/222* | (2006.01) |

(52) U.S. Cl.
CPC ................ *B60R 1/001* (2013.01); *B60R 1/00* (2013.01); *B60R 1/12* (2013.01); *H04N 5/2226* (2013.01); *B60R 2001/1253* (2013.01); *B60R 2300/105* (2013.01); *B60R 2300/303* (2013.01); *B60R 2300/305* (2013.01); *B60R 2300/607* (2013.01); *B60R 2300/806* (2013.01); *B60R 2300/8046* (2013.01)

(58) Field of Classification Search
None
See application file for complete search history.

(56) References Cited

U.S. PATENT DOCUMENTS

| | | | |
|---|---|---|---|
| 8,878,934 B2 | 11/2014 | Ikeda et al. | |
| 9,321,400 B2 | 4/2016 | Wakabayashi et al. | |
| 2013/0044217 A1* | 2/2013 | Ichinose | ........... B60R 1/00 348/148 |

(Continued)

FOREIGN PATENT DOCUMENTS

| | | |
|---|---|---|
| CN | 101489117 A | 7/2009 |
| CN | 101676148 A | 3/2010 |

(Continued)

*Primary Examiner* — Jefferey F Harold
*Assistant Examiner* — Charles N Hicks
(74) *Attorney, Agent, or Firm* — Oblon, McClelland, Maier & Neustadt, L.L.P.

(57) ABSTRACT

An electronic mirror apparatus includes: a camera provided on a lateral surface of a vehicle, the camera being configured to pick up an image of a predetermined pickup range in a vehicle lateral direction and in a vehicle rearward direction; a display device disposed at such a position that a driver visually recognizes the display device; and an electronic control unit configured to perform a process for displaying the image picked up by the camera, on the display device, the electronic control unit being configured to display, on the image, an assist image expressing at least one of an outer part of a region where the vehicle occupies a road surface in planar view of the vehicle and an outside position a predetermined distance away from the outer part of the region where the vehicle occupies the road surface in planar view of the vehicle.

11 Claims, 34 Drawing Sheets

(56) References Cited

U.S. PATENT DOCUMENTS

| | | | |
|---|---|---|---|
| 2013/0162829 A1* | 6/2013 | Kadowaki | B60R 1/00 |
| | | | 348/148 |
| 2014/0218531 A1* | 8/2014 | Michiguchi | G06K 9/00791 |
| | | | 348/148 |
| 2015/0286880 A1* | 10/2015 | Itou | B60L 53/38 |
| | | | 348/148 |
| 2016/0176349 A1 | 6/2016 | Miyoshi et al. | |
| 2016/0185292 A1 | 6/2016 | Asai | |
| 2016/0216128 A1* | 7/2016 | Takano | B62D 15/0295 |
| 2017/0036695 A1 | 2/2017 | Lee et al. | |

FOREIGN PATENT DOCUMENTS

| | | |
|---|---|---|
| CN | 101977797 A | 2/2011 |
| JP | 2002-354467 A | 12/2002 |
| JP | 2004-56219 A | 2/2004 |
| JP | 2006-327433 A | 12/2006 |
| JP | 2007-090939 A | 4/2007 |
| JP | 2007-201748 A | 8/2007 |
| JP | 2009-29203 A | 2/2009 |
| JP | 2016-82329 A | 5/2016 |
| JP | 2016-124391 | 7/2016 |
| JP | 2016-175549 A | 10/2016 |

* cited by examiner

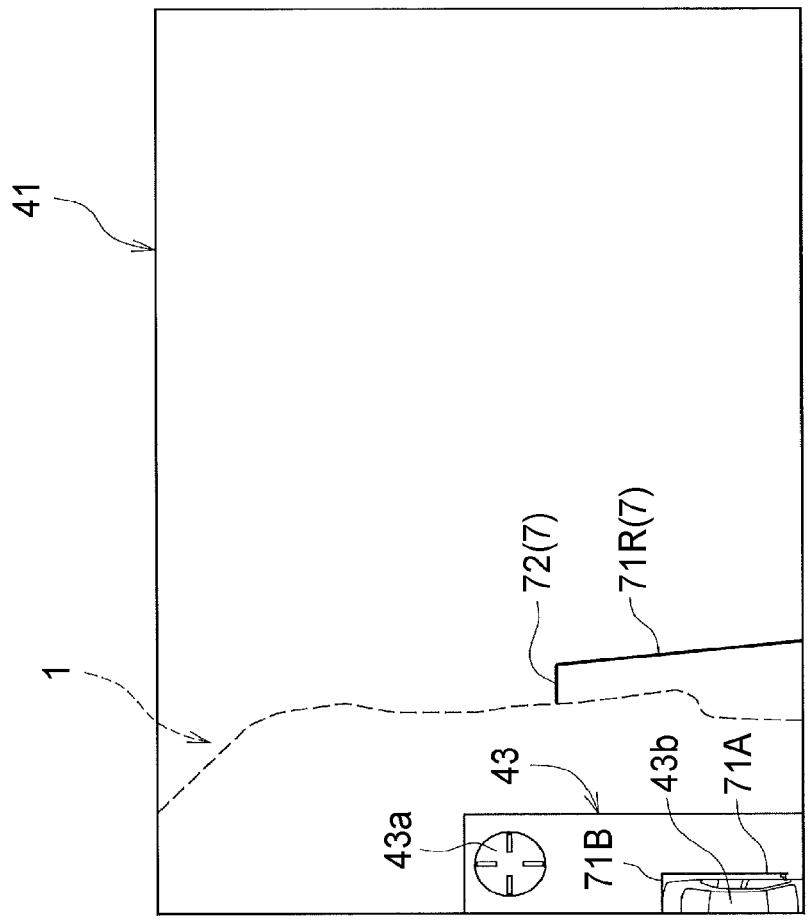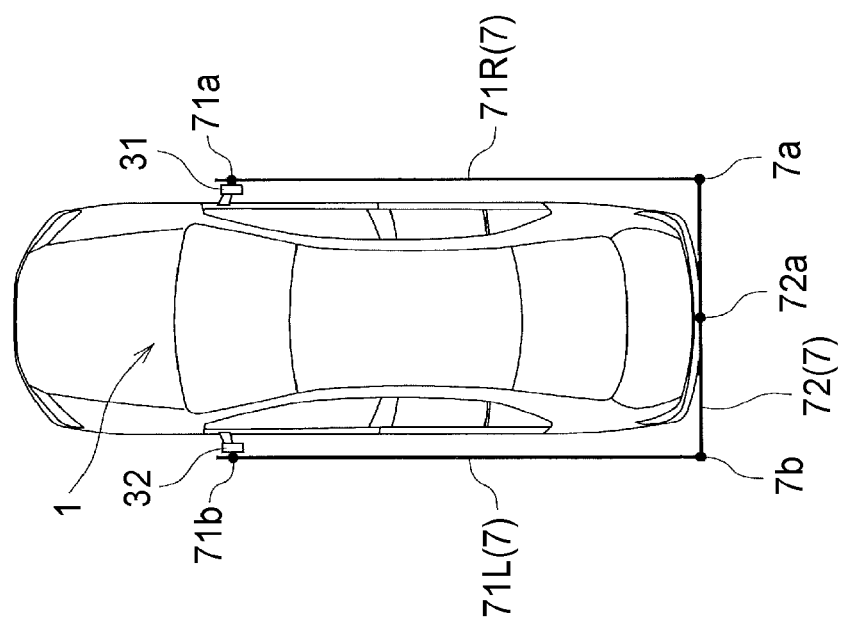

FIG. 11A
FIG. 11B
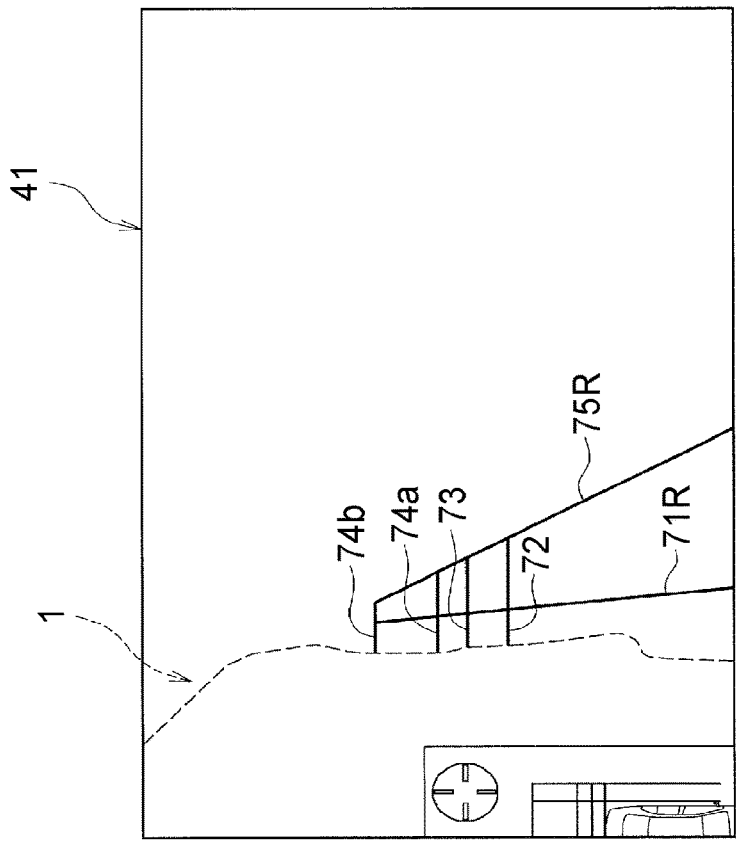
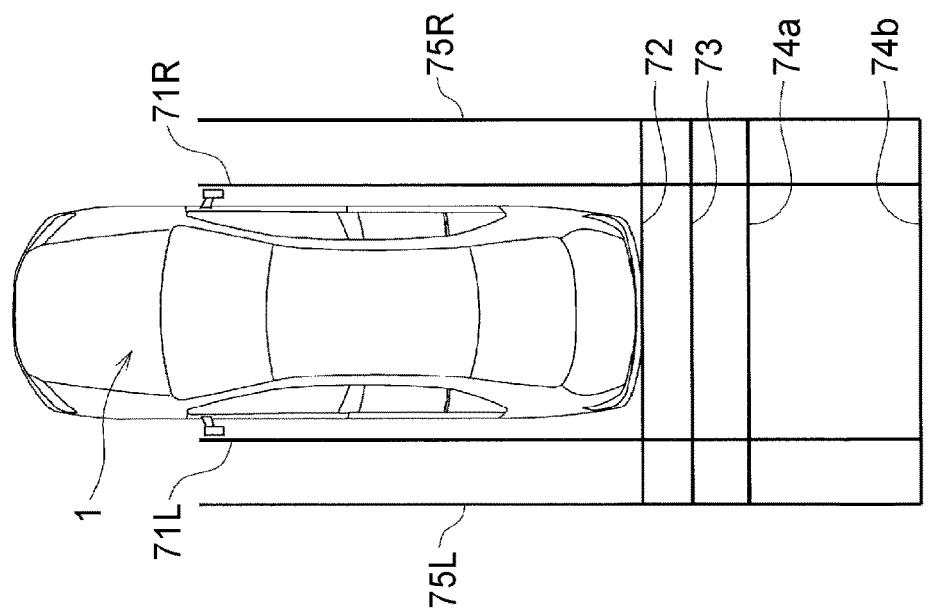

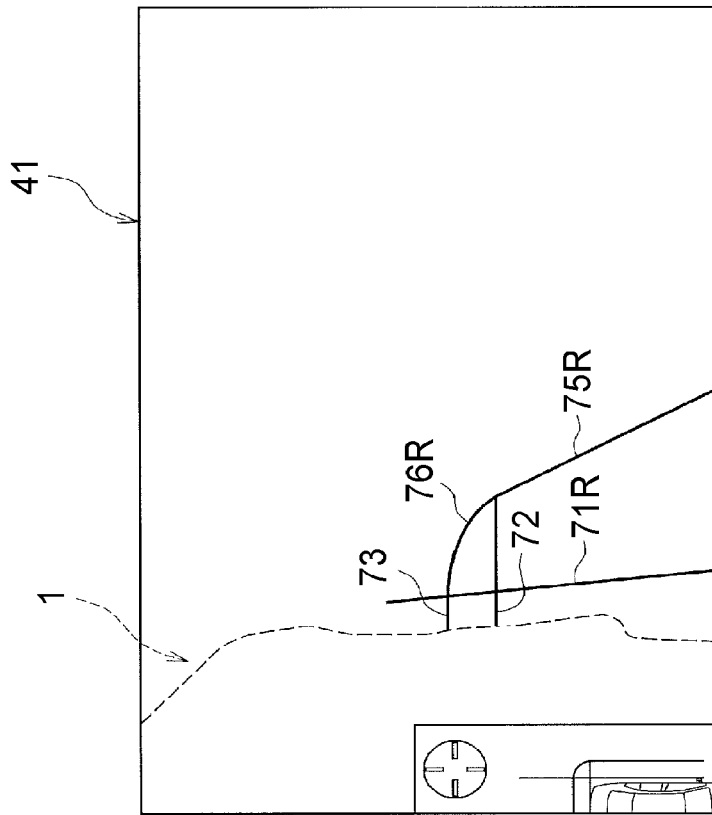
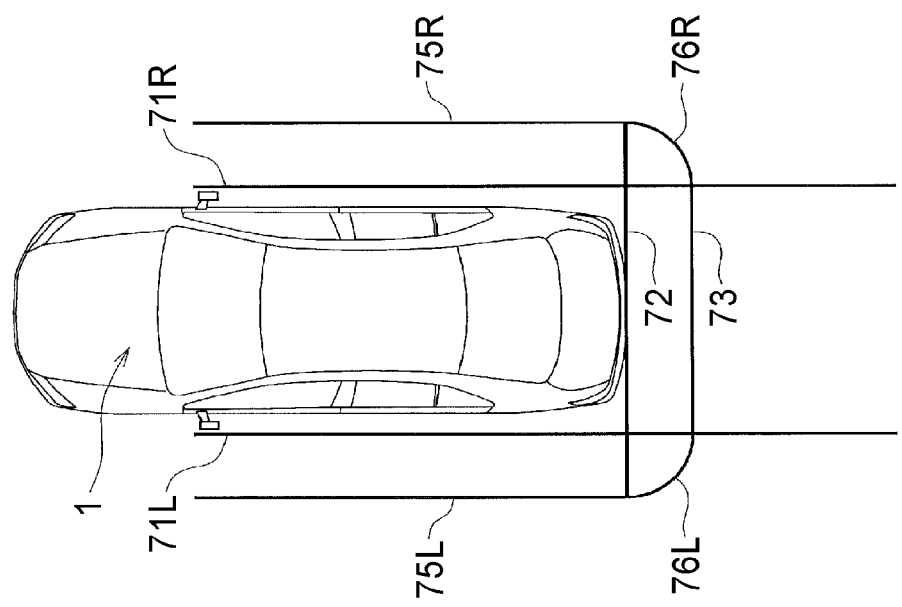

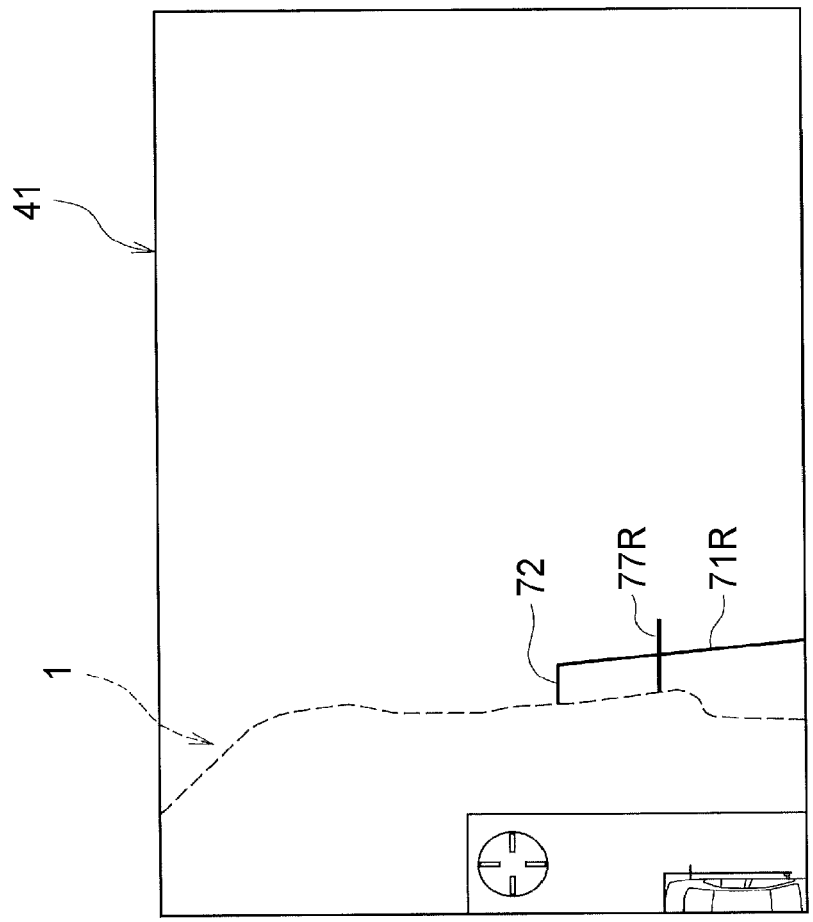
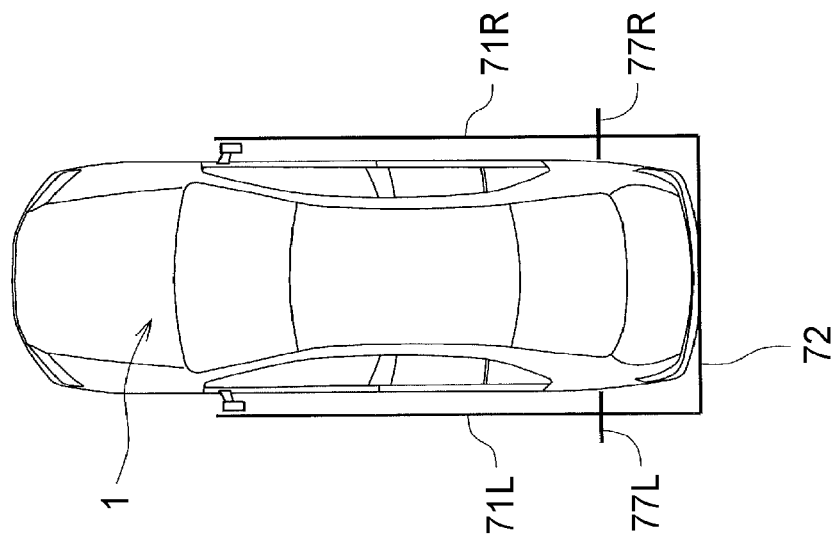

FIG. 17A
FIG. 17B
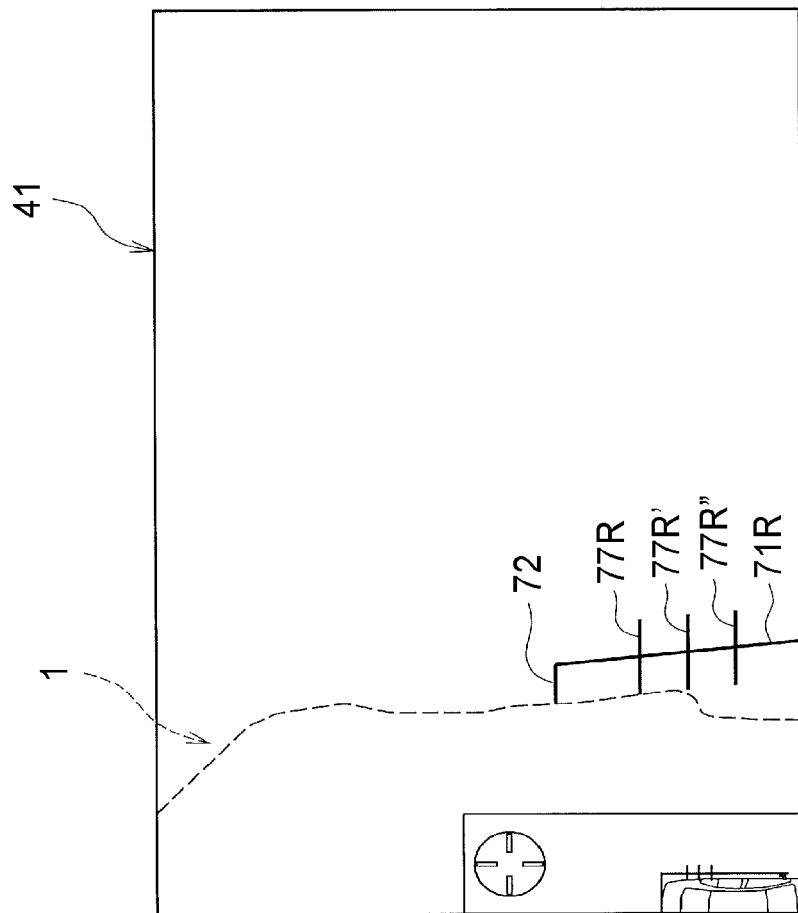
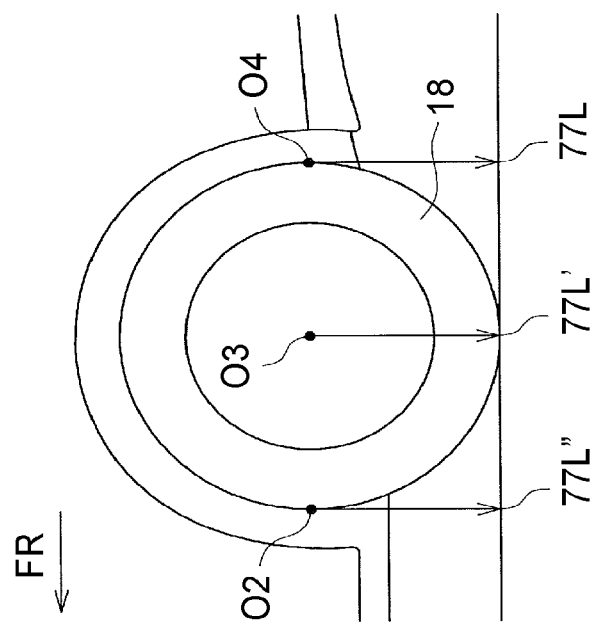

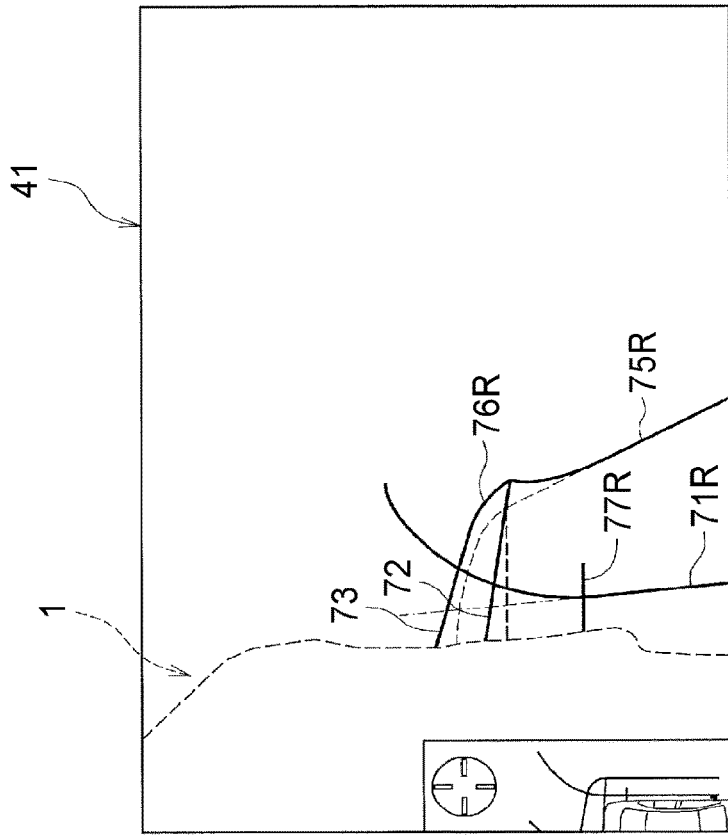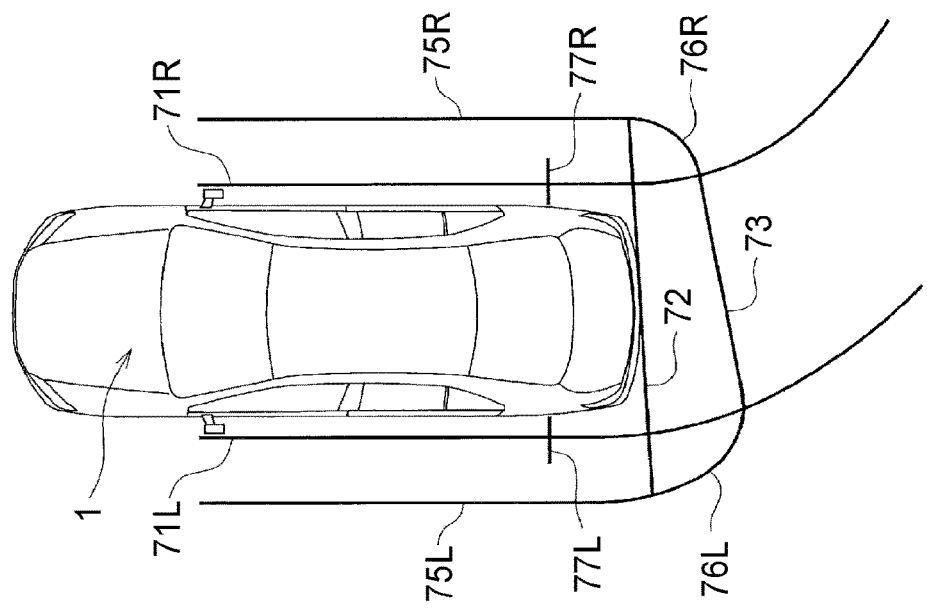

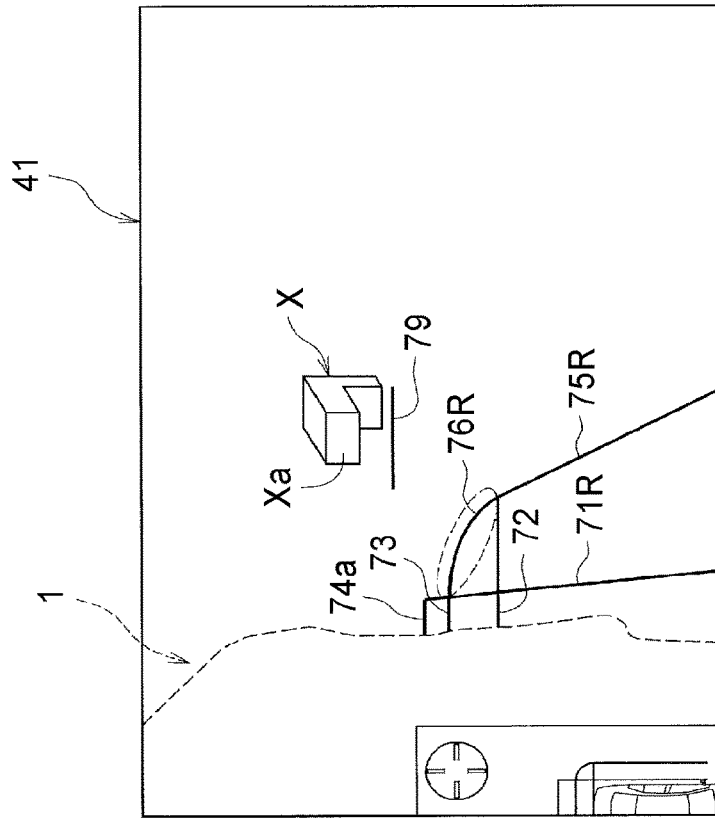
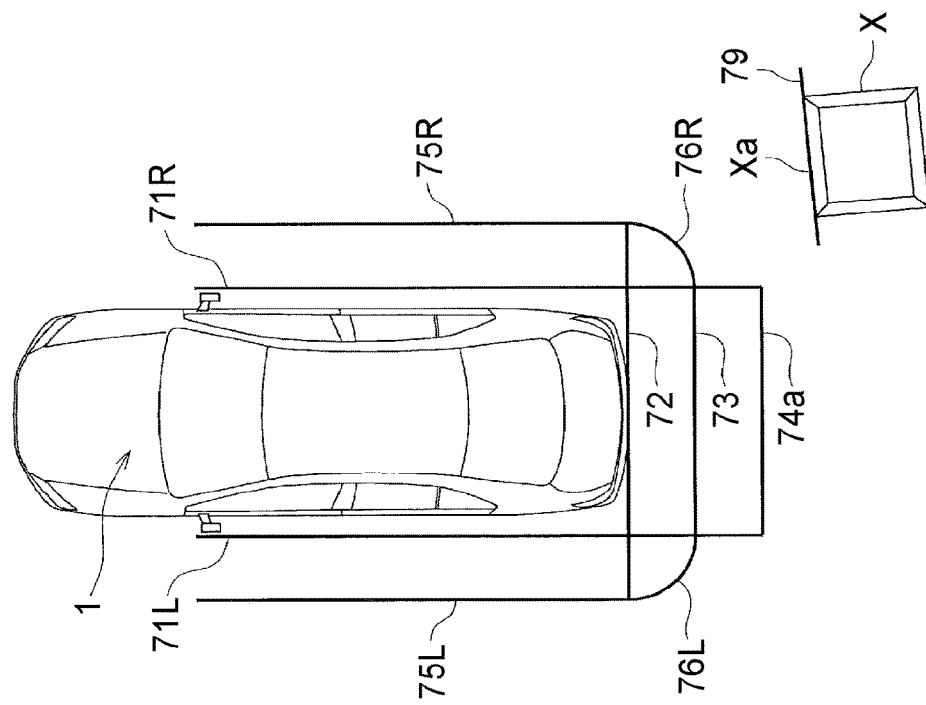

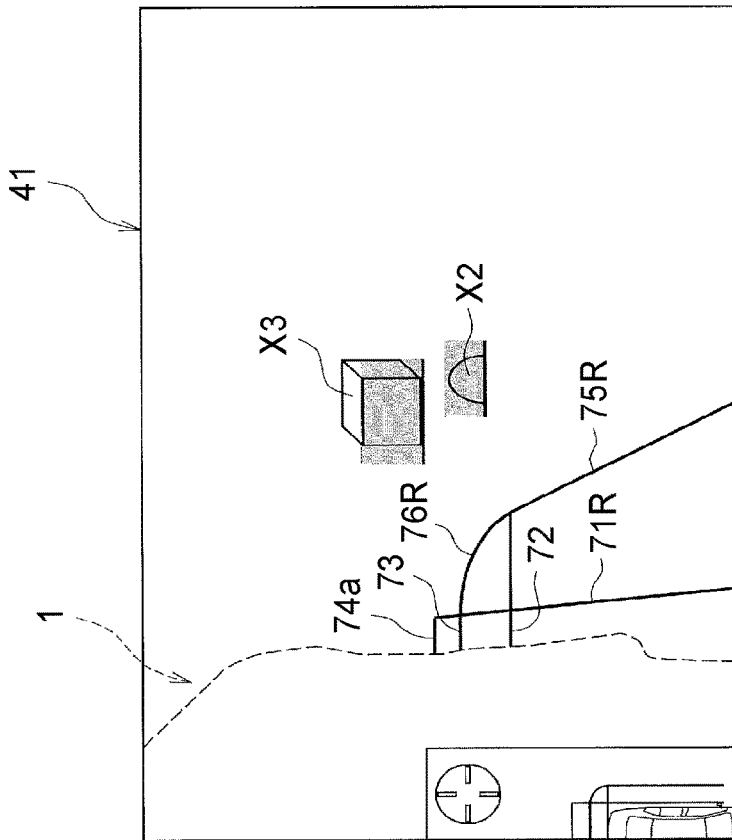
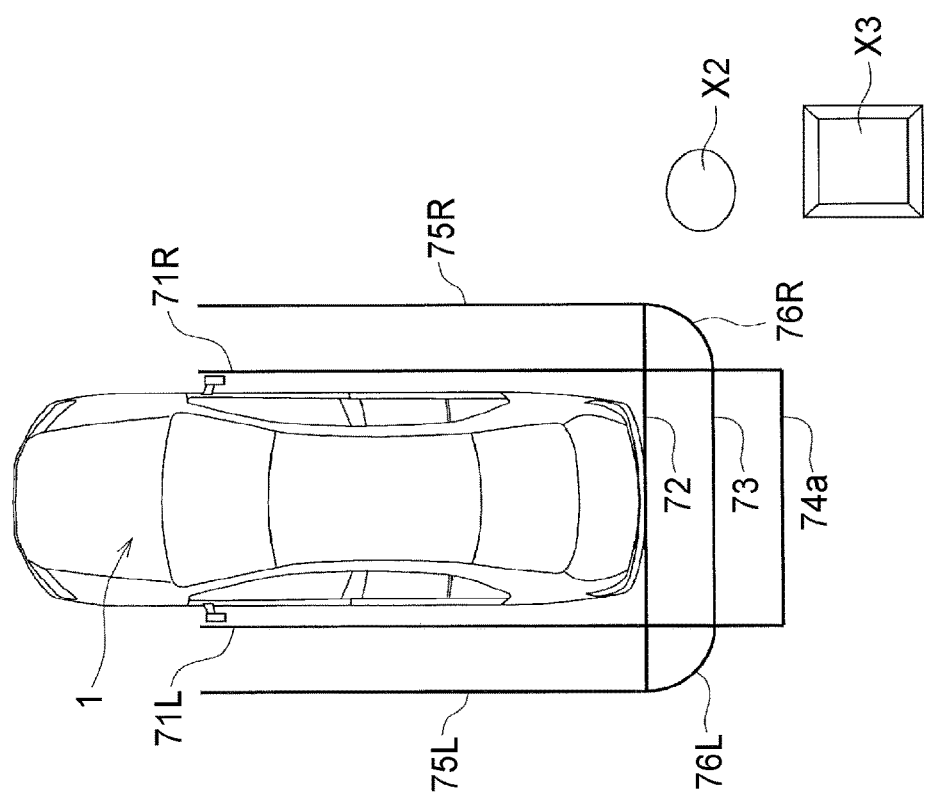

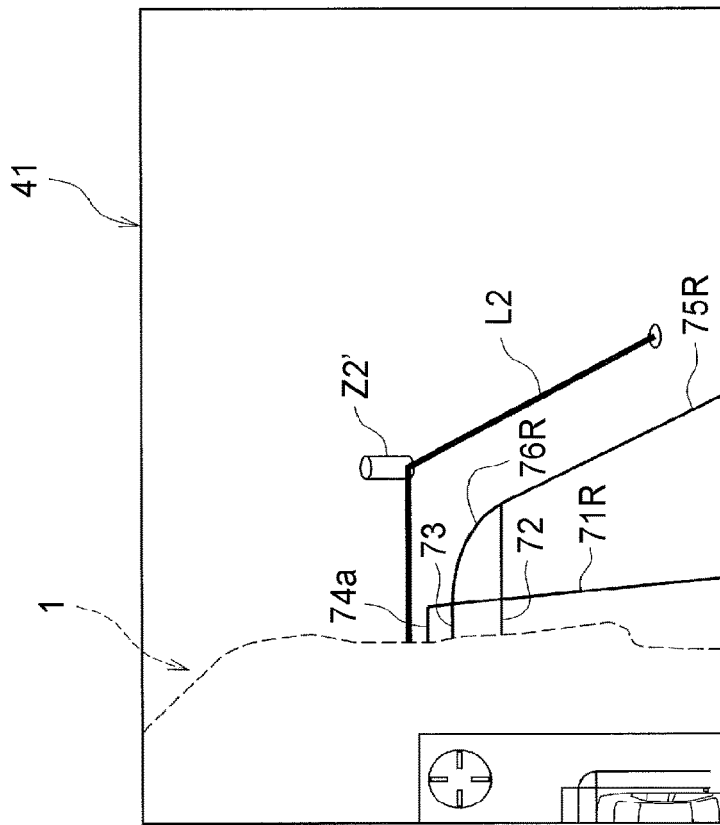
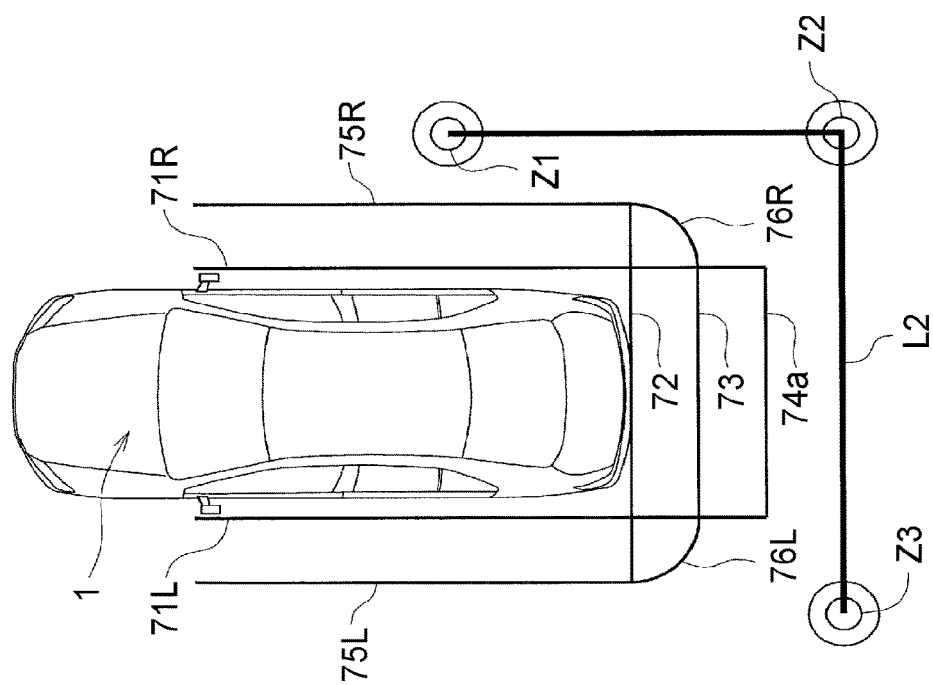

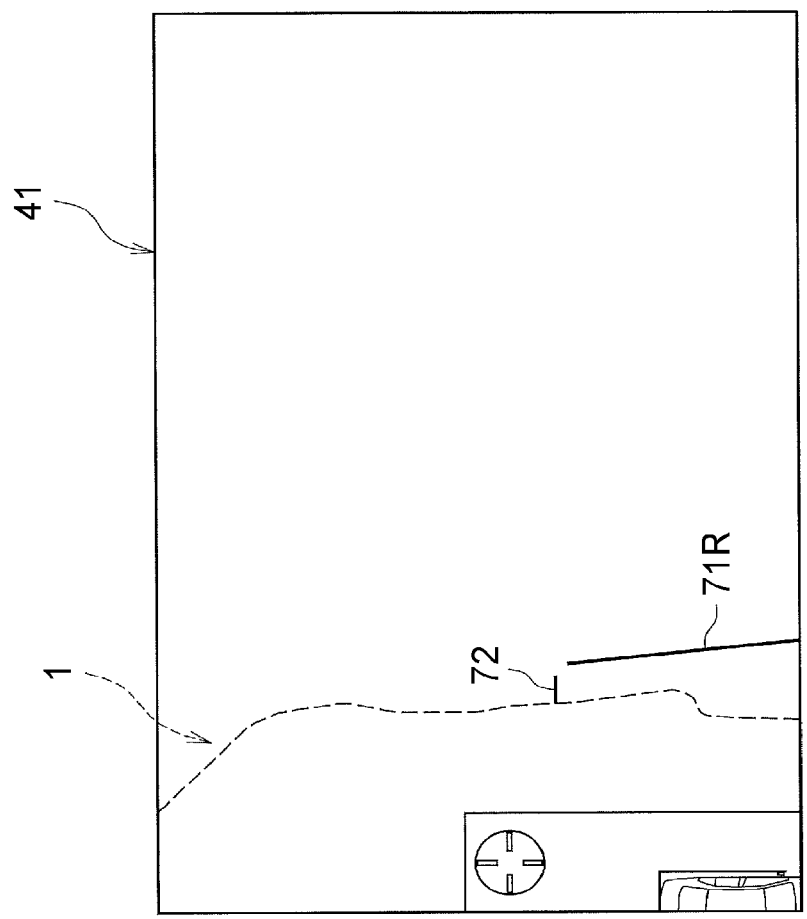
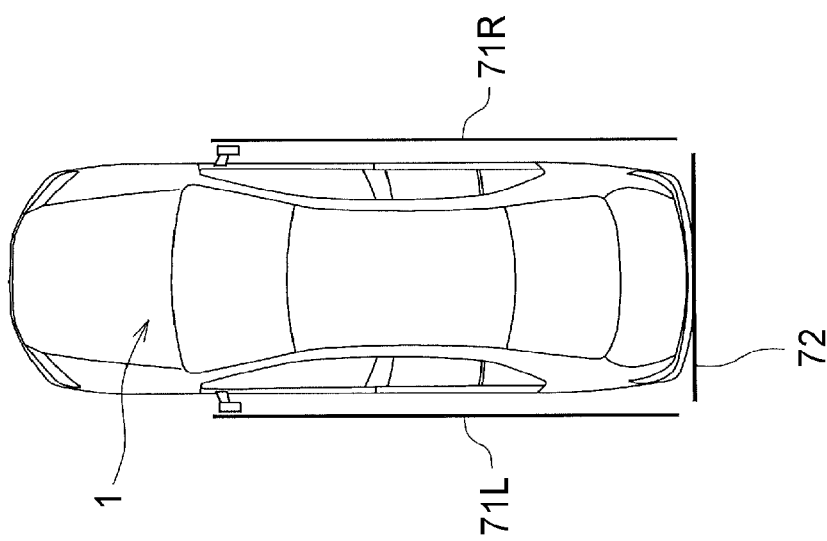

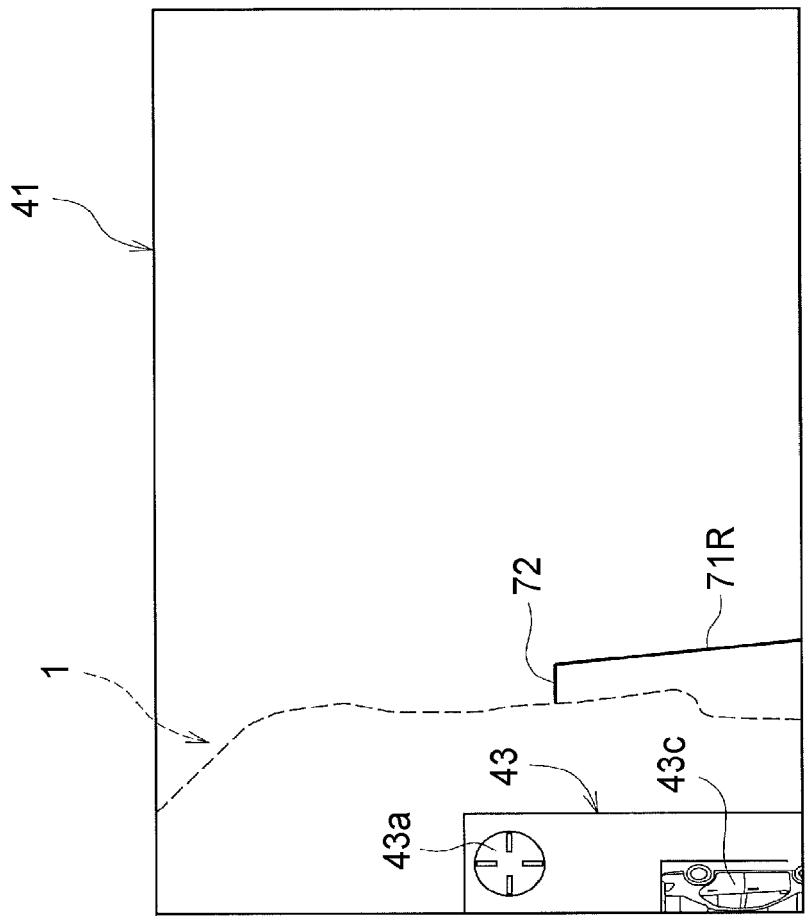
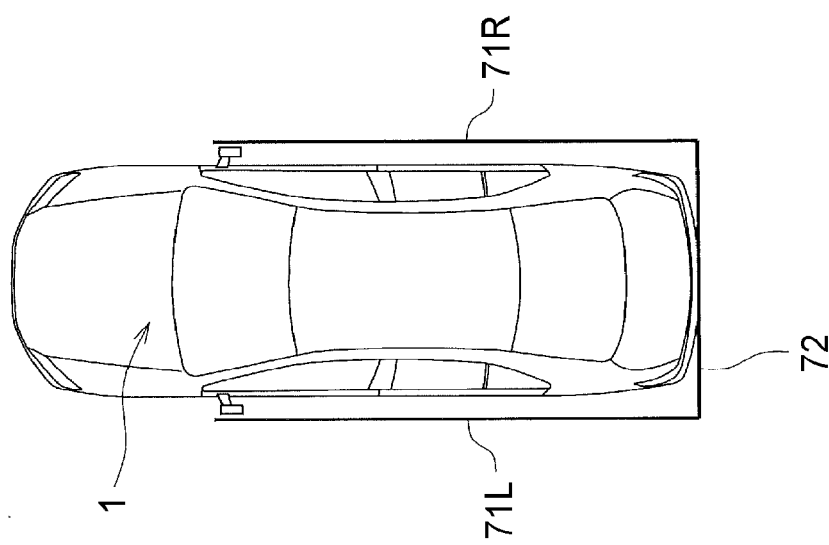

ELECTRONIC MIRROR APPARATUS

INCORPORATION BY REFERENCE

The disclosure of Japanese Patent Application No. 2017-215349 filed on Nov. 8, 2017 including the specification, drawings and abstract is incorporated herein by reference in its entirety.

BACKGROUND

1. Technical Field

The disclosure relates to an electronic mirror apparatus.

2. Description of Related Art

As disclosed in Japanese Patent Application Publication No. 2016-124391, there is known an electronic mirror apparatus that picks up a range from a vehicle lateral direction to a vehicle rearward direction with a camera and displays the picked-up image on a display device disposed in a vehicle cabin, instead of an side mirror (an optical mirror such as a door mirror and a fender mirror) for a vehicle.

By including the electronic mirror apparatus, it is possible to exclude the side mirror. Therefore, it is possible to reduce air resistance at the time of vehicle traveling and to improve fuel consumption rate, and it is possible to increase design flexibility of the vehicle.

SUMMARY

In a situation where a driver needs to visually recognize a close range, for example, in a case where the driver parks the vehicle in a predetermined parking space, effects due to binocular parallax and convergence become dominant because of human visual characteristic, and by the effects, the driver grasps a distance sense and a depth sense (a sense of a distance from an obstacle in the periphery of the parking space, a sense of a depth of the parking space, and the like). In the vehicle equipped with the existing side mirror, it is possible to obtain the effects due to binocular parallax and convergence. Therefore, the driver can grasp the distance sense and the depth sense by watching a figure reflected by the side mirror, and can perform a driving operation for parking.

However, in the vehicle equipped with the electronic mirror apparatus, the image picked up by the camera is displayed on the display device, and the driver watches a two-dimensional image having a short visual distance. Therefore, it is not possible to obtain the effects due to binocular parallax and convergence, and it is difficult to grasp the distance sense and the depth sense.

The disclosure provides a technology that can increase the practical utility of the electronic mirror apparatus by performing an image display that assists the grasp of the distance sense and the depth sense.

A first aspect of the disclosure is an electronic mirror apparatus. The electronic mirror apparatus includes: camera provided on at least one of a right lateral surface and a left lateral surface of a vehicle, the camera being configured to pick up an image of a predetermined pickup range in a vehicle lateral direction and in a vehicle rearward direction; display disposed at such a position that a driver to visually recognizes the display; and electronic control unit being configured to perform a process for displaying the image picked up by the camera, on the display. The electronic control unit is configured to display, on the image, an assist image expressing at least one of an outer part of a region in which the vehicle occupies a road surface in planar view of the vehicle and an outside position a predetermined distance away from the outer part of the region in which the vehicle occupies the road surface in the planar view of the vehicle.

In the first aspect, it is possible to easily recognize the distance between the vehicle and an obstacle or the like in the periphery of the vehicle. That is, although the image to be displayed on the display is a two-dimensional image (although it is not possible to obtain the above-described effects due to binocular parallax and convergence), the assist image assists the grasp of the distance sense and the depth sense. Thereby, it is possible to increase the practical utility of the electronic mirror apparatus.

In the electronic mirror apparatus in the first aspect, the outer part of the region in which the vehicle occupies the road surface in the planar view of the vehicle may contain a rear edge of the vehicle, and the electronic control unit may be configured to display the assist image as a straight line containing at least one of a position of the rear edge of the vehicle and a position of a rear side position a predetermined distance away from the rear edge of the vehicle in the planar view of the vehicle and extending along a vehicle width direction, the position of the rear edge of the vehicle being a position on the road surface when the rear edge of the vehicle is projected on the road surface, the position of the rear side position being a position on the road surface when the rear side position is projected on the road surface.

In the configuration, for example, when the vehicle is moved in reverse to an obstacle such as a wall, it is possible to easily grasp an approach sense for the obstacle (an approach sense in the rear of the vehicle), by visually recognizing the assist image displayed on the display. That is, the assist image assists the grasp of the approach sense for the obstacle. Thereby, it is possible to increase the practical utility of the electronic mirror apparatus.

In the electronic mirror apparatus in the first aspect, the outer part of the region in which the vehicle occupies the road surface in the planar view of the vehicle may contain an outside edge of the camera in a vehicle width direction, and the electronic control unit may be configured to display the assist image as a straight line containing at least one of a position of the outside edge of the camera in the vehicle width direction and a position of an outside position a predetermined distance away from the outside edge of the camera in the vehicle width direction in the planar view of the vehicle and extending along a vehicle front-rear direction, the position of the outside edge of the camera in the vehicle width direction being a position on the road surface when the outside edge of the camera in the vehicle width direction is projected on the road surface, the position of the outside position being a position on the road surface when the outside position is projected on the road surface.

In the configuration, for example, when the vehicle is moved in reverse along an obstacle such as a wall, it is possible to easily grasp an approach sense for the obstacle (an approach sense in the lateral side of the vehicle), by visually recognizing the assist image displayed on the display. That is, also in this case, the assist image assists the grasp of the approach sense for the obstacle. Thereby, it is possible to increase the practical utility of the electronic mirror apparatus.

In the electronic mirror apparatus in the first aspect, the electronic control unit may be configured to acquire position information of a shift lever that is operated by the driver, and may be configured to display the assist image on the image of the predetermined pickup range in the vehicle lateral direction and in the vehicle rearward direction that is displayed on the display, only when a position of the shift lever is a reverse position.

In the configuration, as a situation where the driver needs to visually recognize the vehicle lateral direction and vehicle rearward direction in a close range, there is a case where the driver moves the vehicle in reverse and parks the vehicle in a predetermined parking space. That is, there is a case where the position of the shift lever is the reverse position. In this solution, only when the position of the shift lever is the reverse position, the assist image is displayed on the image of the vehicle lateral direction and vehicle rearward direction that is displayed on the display. Thereby, only when the assist image can be effectively used, the assist image is displayed. In other words, at the time of the forward traveling of the vehicle, the assist image is not displayed, and thereby, the assist image is avoided from interfering with the visual recognition of the vehicle lateral direction and the vehicle rearward direction at the time of the forward traveling.

In the electronic mirror apparatus in the first aspect, the electronic control unit may be configured to display at least an image expressing a position of a rear end position of a rear wheel of the vehicle, as the assist image, the position of the rear end position being a position on the road surface when the rear end position is projected on the road surface.

The configuration is effective when the vehicle is stopped at a position where the rear wheel abuts on a wheel block or the like, at the time of the reverse traveling of the vehicle. That is, the rear wheel abuts on the wheel block at the time when the rear end position of the rear wheel displayed on the display coincides with the position of the wheel block. Therefore, it is possible to grasp the timing of the abutting and perform a driving operation of the vehicle, and it is possible to perform a driving operation allowing the relaxation of the shock when the rear wheel abuts on the wheel block.

In the electronic mirror apparatus in the first aspect, the electronic control unit may be configured to acquire steering angle information of a steering wheel of the vehicle, and may be configured to change the assist image depending on a vehicle traveling direction corresponding to the acquired steering angle information.

In the configuration, by the visual recognition of the assist image by the driver, it is possible to increase the predictability of the traveling direction of the vehicle.

In the electronic mirror apparatus in the first aspect, the electronic control unit may be configured to display an image expressing a position of an obstacle when the obstacle exists in the range of the image picked up by the camera, the position of the obstacle being a position on the road surface when the obstacle is projected on the road surface.

In the configuration, even if the obstacle is above the road surface (some part does not contact with the road surface), the driver can suitably grasp the distance sense for the obstacle, and it is possible to support a driving operation of the vehicle for avoiding the contact with the obstacle.

In the electronic mirror apparatus in the first aspect, the display may be a touch panel type display device, and the electronic control unit may be configured to display an image that is a sign on the road surface, on the image displayed on the display, in response to a touch panel operation to the display.

In the configuration, it is possible to display the image that is the mark, as a guide to a parking place for the vehicle, for example, and thereby, it is possible to support a driving operation for parking.

In the electronic mirror apparatus in the first aspect, the electronic control unit may be configured to recognize a plurality of markers that is installed on the road surface or is implanted into the road surface, and may be configured to display the assist image as a straight line that is obtained when a straight line connecting the markers is projected on the road surface.

In the configuration, the display displays the straight line, without actually drawing a straight line (for example, a box of a parking space) on the road surface, and thereby, the driver can recognize a predetermined region on the road surface.

In the electronic mirror apparatus in the first aspect, the display may include a sub-screen on which an overhead image of the vehicle and the assist image is displayed.

In the configuration, by watching the sub-screen, the driver can easily grasp the position relation between the vehicle and the assist image, and can easily recognize the position of the assist image displayed on the image of the range from the vehicle lateral direction to the vehicle rearward direction.

In the electronic mirror apparatus in the first aspect, the electronic control unit may be configured to switch a display manner of the assist image, in accordance with an operation of display manner switching input device.

In the configuration, it is possible to switch the display manner of the assist image by operating the display manner switching input device, and it is possible to obtain a display manner of the assist image corresponding to a request of the driver.

In the electronic mirror apparatus in the first aspect, the outer part of the region may be an outermost part of the region.

In the first aspect of the disclosure, the electronic mirror apparatus to display the image picked up by the camera on the display displays the assist image expressing at least one of the outer part of the region in which the vehicle occupies the road surface in the planar view of the vehicle and the outside position a predetermined distance away from the outer part of the region in which the vehicle occupies the road surface in the planar view of the vehicle, on the image of the range from the vehicle lateral direction to the vehicle rearward direction that is displayed on the display. Accordingly, the assist image assists the grasp of the distance sense and the depth sense. Thereby, it is possible to increase the practical utility of the electronic mirror apparatus.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5A is a diagram for describing an assist image in a first embodiment, and is a diagram containing a plan view of the vehicle and showing the position of the assist image;

FIG. 5B is a diagram for describing the assist image in the first embodiment, and is a diagram showing a display image on a right-side display device;

FIG. 11A is a diagram showing a fifth embodiment and corresponding to FIG. 5A;

FIG. 11B is a diagram showing the fifth embodiment and corresponding to FIG. 5B;

FIG. 14A is a diagram showing a seventh embodiment and corresponding to FIG. 5A;

FIG. 14B is a diagram showing the seventh embodiment and corresponding to FIG. 5B;

FIG. 15A is a diagram showing an eighth embodiment and corresponding to FIG. 5A;

FIG. 15B is a diagram showing the eighth embodiment and corresponding to FIG. 5B;

FIG. 17A is a diagram showing a ninth embodiment and corresponding to FIG. 5A;

FIG. 17B is a diagram showing the ninth embodiment and corresponding to FIG. 5B;

FIG. 19A is a diagram showing a tenth embodiment and corresponding to FIG. 5A;

FIG. 19B is a diagram showing the tenth embodiment and corresponding to FIG. 5B;

FIG. 21A is a diagram showing a twelfth embodiment and corresponding to FIG. 5A;

FIG. 21B is a diagram showing the twelfth embodiment and corresponding to FIG. 5B;

FIG. 23A is a diagram showing a thirteenth embodiment and corresponding to FIG. 5A;

FIG. 23B is a diagram showing the thirteenth embodiment and corresponding to FIG. 5B;

FIG. 26A is a diagram showing a sixteenth embodiment and corresponding to FIG. 5A;

FIG. 26B is a diagram showing the sixteenth embodiment and corresponding to FIG. 5B;

FIG. 28A is a diagram showing an eighteenth embodiment and corresponding to FIG. 5A;

FIG. 28B is a diagram showing the eighteenth embodiment and corresponding to FIG. 5B;

FIG. 35A is a diagram showing a twenty-fourth embodiment and corresponding to FIG. 5A;

FIG. 35B is a diagram showing the twenty-fourth embodiment and corresponding to FIG. 5B;

DETAILED DESCRIPTION OF EMBODIMENTS

Hereinafter, embodiments of the disclosure will be described based on the drawings. In the embodiments, a case where the disclosure is applied to an electronic mirror apparatus equipped in a sedan type vehicle will be described. The disclosure is not limited to the sedan type vehicle, and can be applied to all types of vehicles.

Schematic Configuration of Electronic Mirror Apparatus

Figure 1:
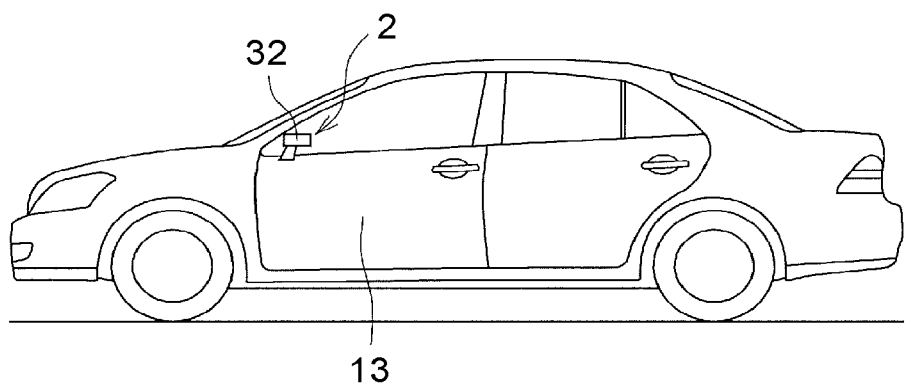
FIG. 1 is a diagram showing a left lateral surface of a vehicle according to an embodiment.
Figure 2:
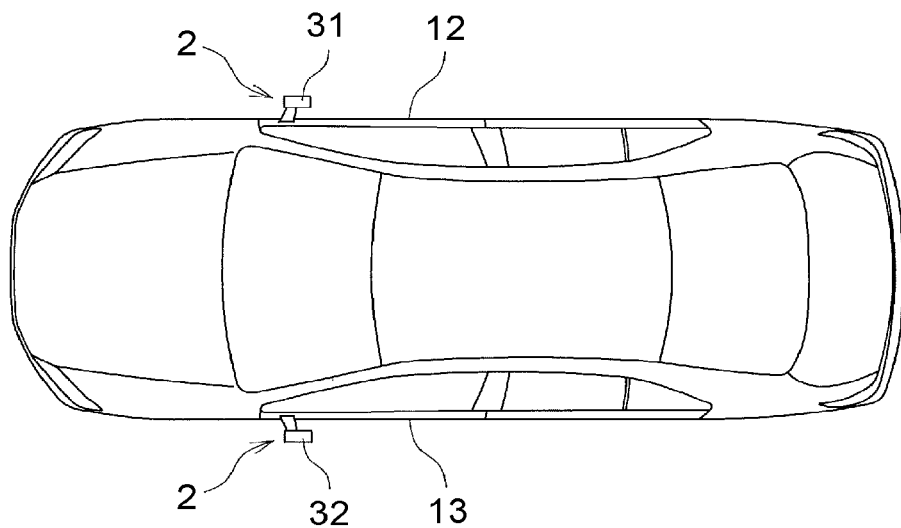
FIG. 2 is a plan view of the vehicle according to the embodiment.
Figure 3:
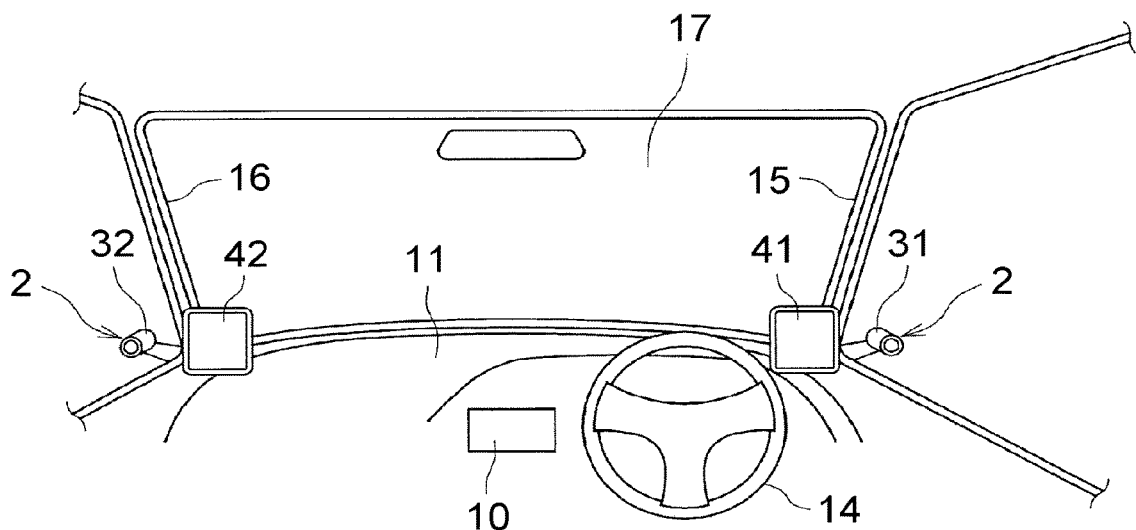
FIG. 3 is a diagram showing an instrument panel and the periphery of the instrument panel in a vehicle cabin of the vehicle according to the embodiment.

FIG. 1 is a diagram showing a left lateral surface of a vehicle 1 according to an embodiment. FIG. 2 is a plan view of the vehicle 1 according to the embodiment. FIG. 3 is a diagram showing an instrument panel 11 and the periphery of the instrument panel 11 in a vehicle cabin of the vehicle 1 according to the embodiment.

As shown in these figures, an electronic mirror apparatus 2 includes cameras (pickup means) 31, 32 respectively disposed at front edge parts of outer panels of right and left front-side doors (front doors) 12, 13, and display devices (display means) 41, 42 on which images respectively picked up by the cameras 31, 32 are displayed.

The right-side camera 31 disposed at the front edge part of the outer panel of the right front door 12 picks up a region from a right lateral direction to a right rearward direction of the vehicle 1. That is, the right-side camera 31 picks up a predetermined pickup range on a horizontal plane from the right lateral direction of the vehicle 1 to the rearward direction along the right lateral surface of the vehicle 1 (a range that is a range in the vehicle right lateral direction and in the vehicle right rearward direction, and that contains a road surface). Further, the left-side camera 32 disposed at the front edge part of the outer panel of the left front door 13 picks up a region from a left lateral direction to a left rearward direction of the vehicle 1. That is, the left-side camera 32 picks up a predetermined pickup range on a horizontal plane from the left lateral direction of the vehicle 1 to the rearward direction along the left lateral surface of the vehicle 1 (a range that is a range in the vehicle left lateral direction and in the vehicle left rearward direction, and that contains a road surface).

For example, the cameras 31, 32 have a configuration of having a pickup element including a complementary metal-oxide semiconductor (CMOS), a charge coupled device (CCD), or the like. The cameras 31, 32 perform the pickup at a predetermined time interval (for example, at an interval of 1/30 seconds), after an ON-operation of an ignition switch 61 (see FIG. 4) of the vehicle 1 and before an OFF-operation of the ignition switch 61, and send signals (pickup image signals) corresponding to pickup images, to image processing units (processing means) 51, 52 described later (see FIG. 4).

Each of the display devices 41, 42 is constituted, for example, by a flat panel display (a liquid crystal display, an organic EL display, a plasma display, or the like), and is disposed at a position that makes it easy for a driver to visually recognize the display device when the driver sits on a driver's seat. As shown in FIG. 3, in the embodiment, the right-side display device 41 is disposed on the right side in the vehicle cabin (at the periphery of an A-pillar 15 on the right side). The left-side display device 42 is disposed on the left side in the vehicle cabin (at the periphery of an A-pillar 16 on the left side). The display devices 41, 42 may be disposed in a front window glass (front windshield) 17. The positions of the display devices 41, 42 are not limited to the peripheries of the A-pillars 15, 16 described above or the interior of the front window glass 17, and only need to be positions that make it easy for the driver to visually recognize the display devices 41, 42. In FIG. 3, reference numeral 14 denotes a steering wheel, and reference numeral 10 denotes a display device of a car navigation or the like.

Figure 4:
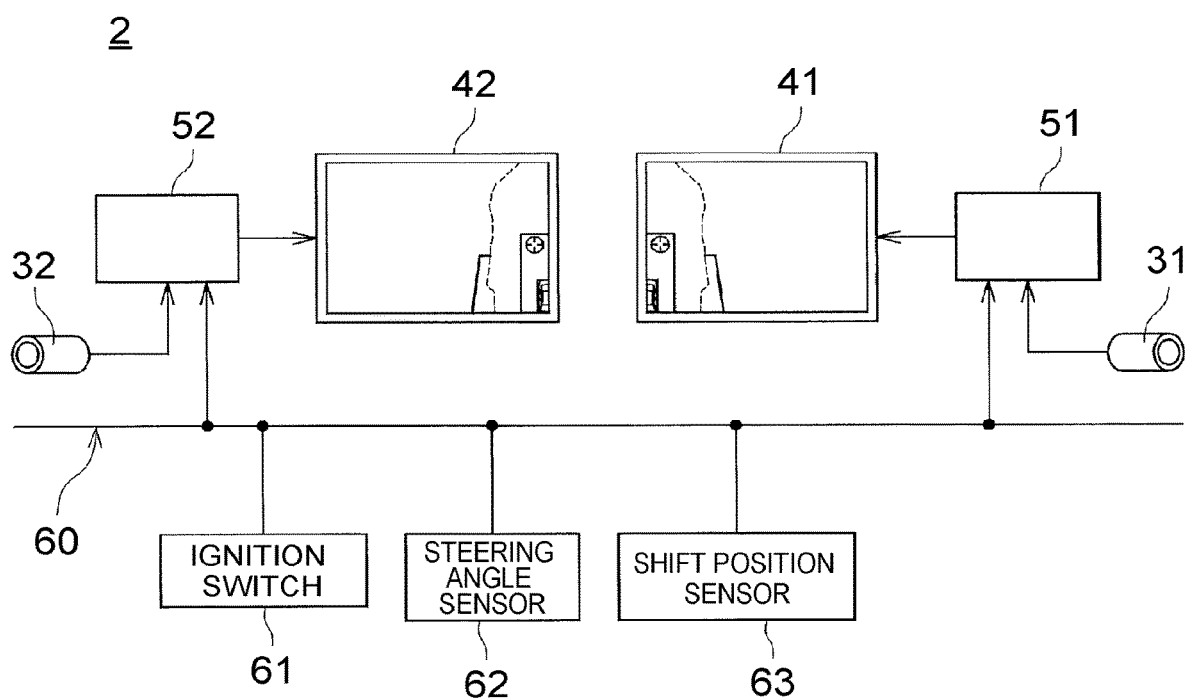
FIG. 4 is a block diagram showing an outline of a system configuration of an electronic mirror apparatus.

Next, a system configuration of an electronic mirror apparatus 2 will be described. FIG. 4 is a block diagram showing an outline of the system configuration of the electronic mirror apparatus 2 according to the embodiment.

As shown in FIG. 4, the electronic mirror apparatus 2 includes a right-side image processing unit 51 and a left-side image processing unit 52. The right-side image processing unit 51 receives the pickup image signal from the right-side camera 31, and performs a process for the pickup image signal. That is, the right-side image processing unit 51, which is connected with the right-side display device 41, performs a predetermined process for the pickup image signal sent from the right-side camera 31, and sends the pickup image signal after the process, to the right-side display device 41. Thereby, the pickup image (the pickup image of the range that is a range from the vehicle right lateral direction to the vehicle right rearward direction and that contains the road surface) after the process is displayed on the right-side display device 41. Similarly, the left-side image processing unit 52 receives the pickup image signal from the left-side camera 32, and performs a process for the pickup image signal. That is, the left-side image processing unit 52, which is connected with the left-side display device 42, performs a predetermined process for the pickup image signal sent from the left-side camera 32, and sends the pickup image signal after the process, to the left-side display device 42. Thereby, the pickup image (the pickup image of the range that is a range from the vehicle left lateral direction to the vehicle left rearward direction and that contains the road surface) after the process is displayed on the left-side display device 42. Each of the image processing units 51, 52 is constituted mainly by a microcomputer. For example, each of the image processing units 51, 52 may be an electronic control unit.

The image processing units 51, 52 are connected with the ignition switch 61, a steering angle sensor 62, and a shift position sensor 63.

The ignition switch 61 is a switch that is operated by the driver, at the time of the system start of the vehicle 1. Whenever the ignition switch 61 is operated, the system start and system stop of the vehicle 1 are repeated, and in conjunction with this, the system start and system stop of the electronic mirror apparatus 2 are repeated.

The steering angle sensor 62 detects the steering angle of the steering wheel 14 (see FIG. 3), and sends the steering angle information to the image processing units 51, 52.

The shift position sensor 63 detects the shift position of a transmission (the shift operation position of a shift lever), and sends the shift operation position information of the shift lever, to the image processing units 51, 52. For example, in the case where the vehicle 1 is equipped with an automatic transmission, shift ranges (shift positions) include a P (parking) range that is a parking position, an R (reverse) range that is a reverse position, an N (neutral) range that is a neutral position, and a D (drive) range that is a traveling (forward traveling) position. The shift position sensor 63 sends information about what range has been selected from the ranges through the shift lever, to the image processing units 51, 52.

Each of the ignition switch 61 and the sensors 62, 63 is connected with the image processing units 51, 52, through an in-vehicle local area network (LAN; for example, a controller area network (CAN)) 60.

Display Switching Control for Display Device

Next, a display switching control for a display device, which is a characteristic of the embodiment, will be described. In the embodiment, in a situation where the electronic mirror apparatus 2 has been actuated by the ON-operation of the ignition switch 61, the images to be displayed on the display devices 41, 42 differ between when the shift position detected by the shift position sensor 63 is the reverse position and when the shift position detected by the shift position sensor 63 is other than the reverse position.

Specifically, when the detected shift position is other than the reverse position, the image processing units 51, 52 perform a process of converting the images for the pickup image signal received from the cameras 31, 32 into images with mirror-reversed information, and send the pickup image signals after the process, to the display devices 41, 42. Thereby, only the pickup image of the range that is a range from the vehicle right lateral direction to the vehicle right rearward direction and that contains the road surface is displayed on the right-side display device 41. Further, only the pickup image of the range that is a range from the vehicle left lateral direction to the vehicle left rearward direction and that contains the road surface is displayed on the left-side display device 42.

On the other hand, when the detected shift position is the reverse position, the image processing units 51, 52 perform the process of converting the images for the pickup image signal received from the cameras 31, 32 into images with mirror-reversed information, and in addition, perform a process of superimposing and displaying assist images described later, on the images with the mirror-reversed information. Then, the image processing units 51, 52 send the pickup image signals after the processes (the pickup image signals in which the assist images are superimposed), to the display devices 41, 42. Further, when the shift position is the reverse position, information (pickup image signals) about images in which the pickup ranges by the cameras 31, 32 are enlarged is sent to the display devices 41, 42. Thereby, an image resulting from superimposing the assist image on the pickup image of a range that is an enlarged pickup range, that is a range from the vehicle right lateral direction to the vehicle right rearward direction, and that contains the road surface is displayed on the right-side display device 41. Further, an image resulting from superimposing the assist image on the pickup image of a range that is an enlarged pickup range, that is a range from the vehicle left lateral direction to the vehicle left rearward direction, and that contains the road surface is displayed on the left-side display device 42.

Hereinafter, the assist image will be described.

As the display manner of the assist image to be displayed on the display devices 41, 42, there is a plurality of embodiments. First, an assist image in a first embodiment will be described.

First Embodiment

The assist image in the embodiment is an image for assisting the grasp of a distance sense and a depth sense when the driver visually recognizes the display devices 41, 42, and expresses an outermost part of a region in which the vehicle 1 occupies the road surface in planar view of the vehicle 1. The outermost part of the region may be an outer part of the region.

FIG. 5A and FIG. 5B are diagrams for describing the assist image. FIG. 5A is a diagram containing a plan view of the vehicle 1 and showing the position of an assist image 7, and FIG. 5B is a diagram showing a display image on the right-side display device 41 (a display device on which the assist image 7 is superimposed and displayed). The display image on the left-side display device 42 is symmetrical to the display image on the right-side display device 41.

As shown in FIG. 5A and FIG. 5B, vehicle-width-directional outermost part display lines 71R, 71L extending along a vehicle front-rear direction and a vehicle rear edge display line 72 extending along a vehicle width direction are drawn as the assist image 7. The vehicle-width-directional outermost part display line 71R is displayed on the right-side display device 41, and the vehicle-width-directional outermost part display line 71L is displayed on the left-side display device 42.

The vehicle-width-directional outermost part display lines 71R, 71L are the examples of assist images expressing the outermost part of the region in which the vehicle occupies the road surface in the planar view of the vehicle in the disclosure, and are the examples of straight lines on the assumption that straight lines containing the positions on the road surface of outside edges (see a point 71a and a point 71b in FIG. 5A) of the cameras 31, 32 in the vehicle width direction when the outside edges are projected on the road surface, in the planar view of the vehicle 1, and extending along the vehicle front-rear direction are drawn on the road surface.

The vehicle rear edge display line 72 is the assist image expressing the outermost part of the region in which the vehicle occupies the road surface in the planar view of the vehicle, and is a straight line on the assumption that a straight line containing the position on the road surface of a vehicle rear edge (for example, a rear edge of a rear bumper; see a point 72a in FIG. 5A) when the vehicle rear edge is projected on the road surface, in the planar view of the vehicle 1, and extending along the vehicle width direction is drawn on the road surface.

The vehicle-width-directional outermost part display line 71R, 71L are not drawn on the vehicle rearward side of the intersection points (see the points 7a, 7b in FIG. 5A) between the vehicle-width-directional outermost part display lines 71R, 71L and the vehicle rear edge display line 72, and the vehicle rear edge display line 72 is not drawn on the vehicle-width-directional outer sides from the intersection points 7a, 7b.

In the display of the vehicle-width-directional outermost part display lines 71R, 71L and the vehicle rear edge display line 72 on the display devices 41, 42, since the distance between the cameras 31, 32 and the road surface is a fixed value, the positions of the vehicle-width-directional outermost part display lines 71R, 71L and the position of the vehicle rear edge display line 72 on the road surface are unambiguously determined for each vehicle 1. The drawing positions of the vehicle-width-directional outermost part display lines 71R, 71L and the drawing position of the vehicle rear edge display line 72 are previously determined by an experiment or a simulation, and the information is stored in ROMs of the image processing units 51, 52. Then, when appropriate (when the shift position becomes the reverse position), the information of the vehicle-width-directional outermost part display lines 71R, 71L and the vehicle rear edge display line 72 is read from the ROMs, and is displayed on each of the display devices 41, 42, as the assist image 7 (71R, 71L, 72).

The color of the assist image 7 (71R, 71L, 72) to be displayed on each of the display devices 41, 42 can be arbitrarily set, but preferably should be blue, red or the like, which has a high visibility. It is more preferable that the color of the assist image 7 (71R, 71L, 72) be set depending on the driver. For example, when the driver is a healthy person, the color of the assist image 7 may be blue, red or the like. When the driver is a color-blind person, the red is hard to visually recognize, and therefore, it is preferable that the color of the assist image 7 be another color. The color of the assist image 7 (71R, 71L, 72) may be changed by an operation of an operation key image 43a described later.

In the embodiment, when the shift position detected by the shift position sensor 63 is the reverse position, the assist image 7 (71R, 71L, 72) is superimposed and displayed. Thereby, for example, when the driver parks the vehicle 1 while moving the vehicle 1 in reverse, the driver can grasp the outermost part of the region in which the vehicle 1 occupies the road surface, by visually recognizing the assist image 7 (71R, 71L, 72) displayed on each of the display devices 41, 42. Therefore, the driver can easily recognize the distance between the vehicle 1 and an obstacle or the like in the periphery of the vehicle 1. That is, although the image to be displayed on each of the display devices 41, 42 is a two-dimensional image (although it is not possible to obtain the above-described effects due to binocular parallax and convergence), the assist image 7 (71R, 71L, 72) assists the grasp of the distance sense and the depth sense.

Further, as shown in FIG. 5B, in the state where the assist image 7 (71R, 71L, 72) is displayed on the right-side display device 41, a sub-screen 43 is displayed at a lower left corner of a screen of the right-side display device 41. On the sub-screen 43, the operation key image 43a is displayed at an upper part, and a vehicle planar-view image 43b that is an overhead image of the vehicle 1 and the assist image 7 is displayed at a lower part.

The operation key image 43a is a graphical user interface (GUI) showing a so-called cross-key. Since the right-side display device 41 is a touch panel type display device, the operation key image 43a can be operated by an occupant. For example, a display mode can be switched by the operation of the operation key image 43a. The display mode includes an assist-image superimposition display mode and an assist-image non-display mode. The assist-image superimposition display mode is a mode in which the assist image 7 (71R, 71L, 72) is displayed on each of the display devices 41, 42 when the shift position is the reverse position. The assist-image non-display mode is a mode in which the assist image 7 (71R, 71L, 72) is not displayed on each of the display devices 41, 42 even when the shift position is the reverse position. As the switching of the display manner of each of the display devices 41, 42 by the operation of the operation key image 43a, there are various other types, which will be described later.

The operation key image 43a is not limited to the cross-key, and various display manners can be applied. When the right-side display device 41 is not a touch panel type display device, the display mode may be switched by the operation of a mirror control switch that is disposed at a front end part of a door arm rest, or the like. Even in this case, it is preferable to display the operation key image 43a imitating the mirror control switch, for informing the driver that the display mode can be switched by the mirror control switch. Other than the mirror control switch, the switching of the display mode may be performed by switches such as a flexible arrow key and a joystick.

The vehicle planar-view image 43b is an image that makes it easy for the driver to understand what site of the vehicle corresponds to the assist image 7 (71R, 71L, 72). That is, on the planar image of the vehicle 1 displayed in the vehicle planar-view image 43b, a straight line 71A is drawn at a position corresponding to the vehicle-width-directional outermost part display line 71R, 71L and a straight line 71B is drawn at a position corresponding to the vehicle rear edge display line 72. Further, the same image is displayed also on the left-side display device 42.

Figure 6:
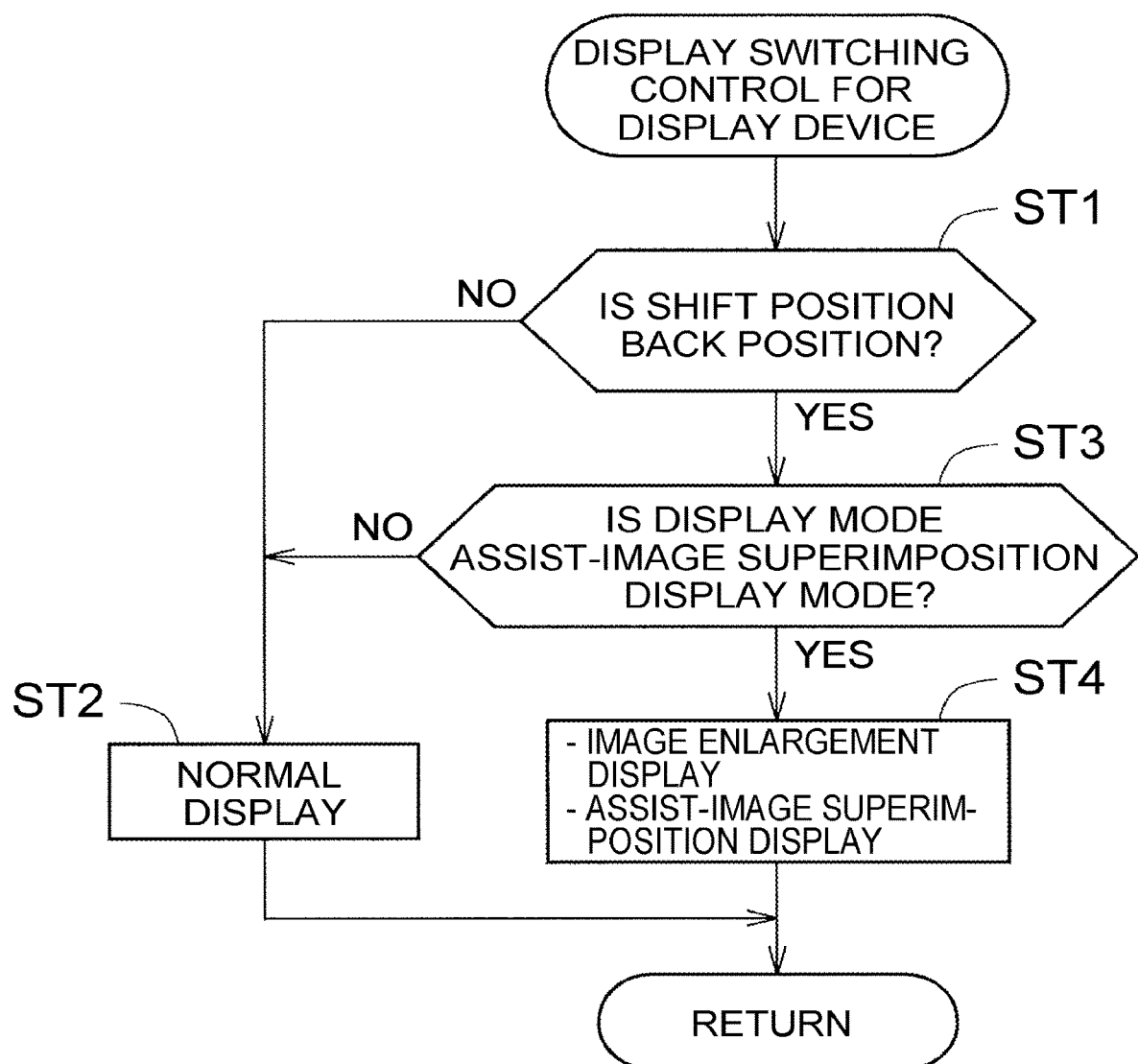
FIG. 6 is a flowchart showing a procedure of a display switching control for a display device.

FIG. 6 is a flowchart showing a procedure of a display switching control for the display devices 41, 42 in the embodiment. The flowchart is repeatedly executed at a predetermined time interval, after the ON-operation of the ignition switch 61 of the vehicle 1. By the ON-operation of the ignition switch 61, the cameras 31, 32 and the display devices 41, 42 receive electric power, and start to be actuated. The cameras 31, 32 each pick up a predetermined range from the vehicle lateral direction to the vehicle rearward direction. Then, the signals of the picked-up images are displayed on the display devices 41, 42 through the image processing units 51, 52.

First, in step ST1, it is determined whether the current shift position detected by the shift position sensor 63 is the reverse position.

When the current shift position is not the reverse position and the determination of NO is made in step ST1, the procedure transitions to step ST2, and the normal display of the display devices 41, 42 is performed. That is, the image processing units 51, 52 perform the display without superimposing the assist image 7 (71R, 71L, 72), and display mirror-reversed images of images for the pickup image signals received from the cameras 31, 32, on the display devices 41, 42.

Figure 7A:
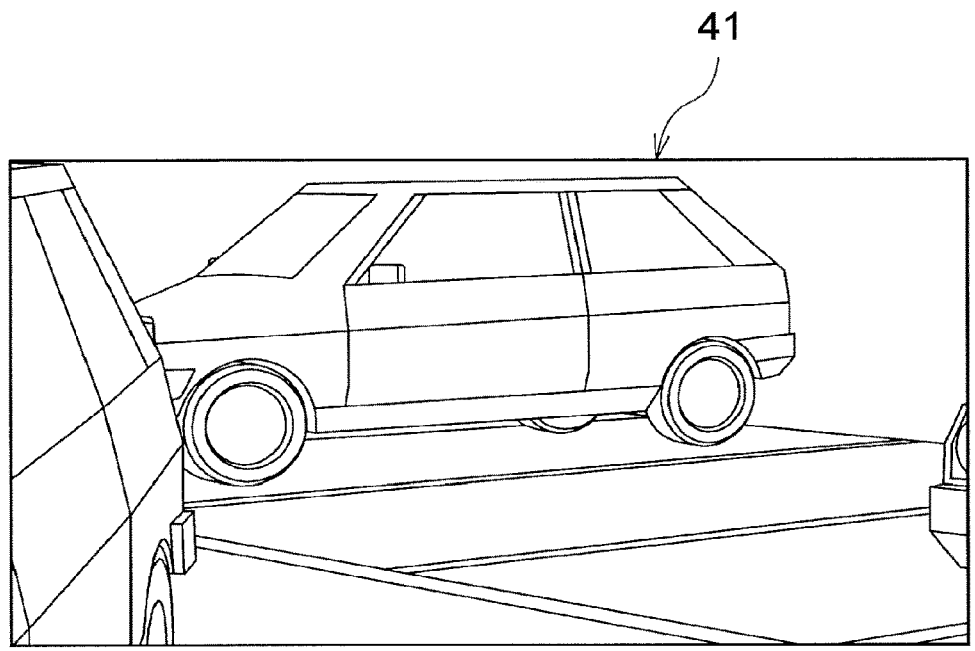
FIG. 7A is a diagram showing an exemplary display image on the display device when a shift position is other than a reverse position.

FIG. 7A shows an exemplary display image (a state before the parking in a parking space) on the right-side display device 41 when the shift position is other than the reverse position. As shown in FIG. 7A, when the shift position is other than the reverse position, the right-side image processing unit 51 performs the process of converting the image for the pickup image signal received from the right-side camera 31 into the image with the mirror-reversed information, and sends the pickup image signal after the process, to the right-side display device 41. Thereby, only the pickup image of the range that is a range from the vehicle right lateral direction to the vehicle right rearward direction and that contains the road surface is displayed on the right-side display device 41. Further, the same process is performed also by the left-side image processing unit 52, so that only the pickup image of the range that is a range from the vehicle left lateral direction to the vehicle left rearward direction and that contains the road surface is displayed on the left-side display device 42.

On the other hand, when the current shift position is the reverse position and the determination of YES is made in step ST1, the procedure transitions to step ST3, and it is determined whether the current display mode is the assist-image superimposition display mode.

When the current display mode is not the assist-image superimposition display mode and the determination of NO is made in step ST3, the procedure transitions to step ST2, and the normal display of the display devices 41, 42 is performed. That is, also in this case, the image processing units 51, 52 perform the display without superimposing the assist image 7 (71R, 71L, 72), and display the mirror-reversed images of the images for the pickup image signals received from the cameras 31, 32, on the display devices 41, 42.

When the current display mode is the assist-image superimposition display mode and the determination of YES is made in step ST3, the procedure transitions to step ST4. Then, the images to be displayed on the display devices 41, 42 are enlarged, and the assist images 7 (71R, 71L, 72) are superimposed and displayed on the enlarged images.

Figure 7B:
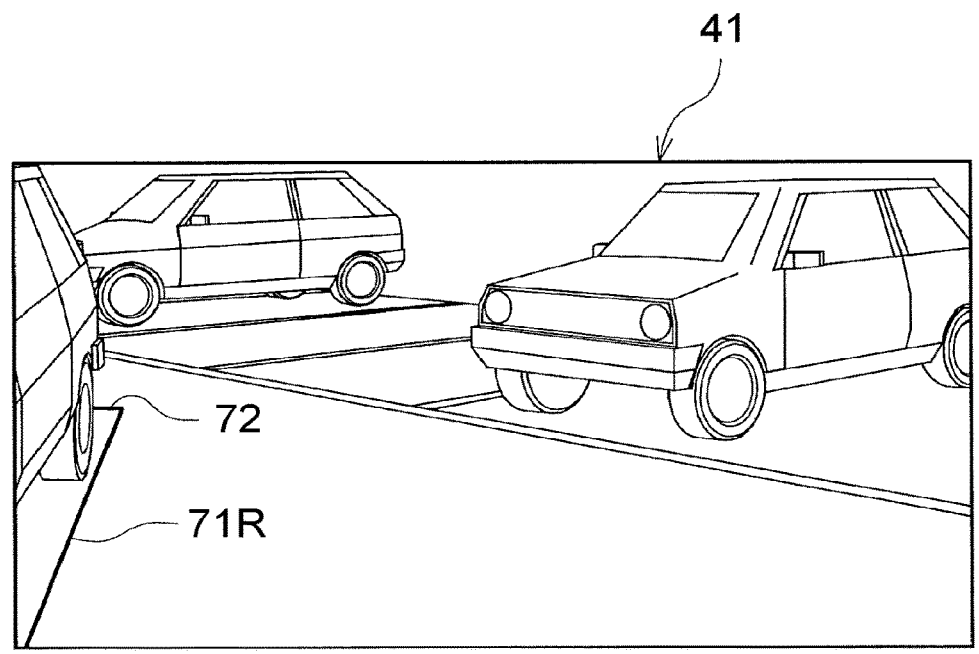
FIG. 7B is a diagram showing an exemplary display image on the display device when the shift position is the reverse position.

FIG. 7B shows an exemplary display image (a state before the parking in a parking space) on the right-side display device 41 when the shift position is the reverse position. As shown in FIG. 7B, when the shift position is the reverse position, the right-side image processing unit 51 performs the process of converting the image for the pickup image signal received from the right-side camera 31 into the image with the mirror-reversed information, and in addition, performs the process of superimposing and displaying the assist image 7 (71R, 71L, 72) on the image. Further, the right-side image processing unit 51 performs the process of enlarging the pickup range of the right-side camera 31 (enlarging the pickup range compared to the pickup range shown in FIG. 7A). Then, the right-side image processing unit 51 sends the pickup image signal after the process, to the right-side display device 41. Thereby, an image resulting from superimposing the assist image 7 (71R, 71L, 72) on the pickup image of a range that is an enlarged pickup range, that is a range from the vehicle right lateral direction to the vehicle right rearward direction, and that contains the road surface is displayed on the right-side display device 41. Further, the same processes are performed also by the left-side image processing unit 52, so that an image resulting from superimposing the assist image 7 (71R, 71L, 72) on the pickup image of a range that is an enlarged pickup range, that is a range from the vehicle left lateral direction to the vehicle left rearward direction, and that contains the road surface is displayed on the left-side display device 42.

The above behaviors are repeated. Therefore, the behavior in step ST4 corresponds to the example of the behavior of the electronic control unit in the disclosure (the electronic control unit configured to superimpose and display the assist image expressing the outermost part of the region in which the vehicle occupies the road surface in the planar view of the vehicle, on the image of the range from the vehicle lateral direction to the vehicle rearward direction that is picked up by the camera and is displayed on the display).

As described above, in the state where the assist image 7 (71R, 71L, 72) expressing the outermost part of the region in which the vehicle 1 occupies the road surface in the planar view of the vehicle 1 is superimposed and displayed on the image (the image of the range from the vehicle lateral direction to the vehicle rearward direction) displayed on each of the display devices 41, 42, the driver can grasp the outermost of the region in which the vehicle 1 occupies the road surface by visually recognizing the assist image 7 (71R, 71L, 72) displayed on each of the display devices 41, 42. Therefore, the driver can easily recognize the distance between the vehicle 1 and an obstacle or the like in the periphery of the vehicle 1, allowing the prevention of the contact with the obstacle or the like. That is, although the image to be displayed on each of the display devices 41, 42 is a two-dimensional image (although it is not possible to obtain the above-described effects due to binocular parallax and convergence), the assist image 7 (71R, 71L, 72) assists the grasp of the distance sense and the depth sense. Thereby, it is possible to increase the practical utility of the electronic mirror apparatus 2.

In the embodiment, the vehicle-width-directional outermost part display lines 71R, 71L are displayed as straight lines on the assumption that straight lines containing the positions on the road surface of the outside edges 71a, 71b of the cameras 31, 32 in the vehicle width direction when the outside edges 71a, 71b are projected on the road surface, in the planar view of the vehicle 1, and extending along the vehicle front-rear direction are drawn on the road surface. Without being limited to this, the positions of the vehicle-width-directional outermost part display lines 71R, 71L can be regulated, for example, by the operation of the operation key image 43a by the occupant (or the operation of the mirror control switch or the like). For example, by the operation of the operation key image 43a (or the operation of the mirror control switch or the like), the vehicle-width-directional outermost part display lines 71R, 71L may be displayed as straight lines on the assumption that straight lines containing positions slightly away in the vehicle-width outward direction from the positions on the road surface of the outside edges 71a, 71b of the cameras 31, 32 in the vehicle width direction when the outside edges 71a, 71b are projected on the road surface, in the planar view of the vehicle 1, and extending along the vehicle front-rear direction are drawn on the road surface.

Similarly, in the embodiment, the vehicle rear edge display line 72 is displayed as a straight line on the assumption that a straight line containing the position on the road surface of the vehicle rear edge 72a when the vehicle rear edge 72a is projected on the road surface, in the planar view of the vehicle 1, and extending along the vehicle width direction is drawn on the road surface. Without being limited to this, the position of the vehicle rear edge display line 72 can be regulated, for example, by the operation of the operation key image 43a by the occupant (or the operation of the mirror control switch or the like). For example, by the operation of the operation key image 43a (or the operation of the mirror control switch or the like), the vehicle rear edge display line 72 may be displayed as a straight line on the assumption that a straight line containing a position slightly away in the vehicle rearward direction from the position on the road surface of the vehicle rear edge 72a when the vehicle rear edge 72a is projected on the road surface, in the planar view of the vehicle 1, and extending along the vehicle width direction is drawn on the road surface.

Second Embodiment

Next, a second embodiment will be described. In the embodiment, the display manner of the assist image 7 is different from that in the first embodiment. The other configuration and behavior are the same as those in the first embodiment, and therefore, only the display manner of the assist image 7 will be described.

Figure 8B:
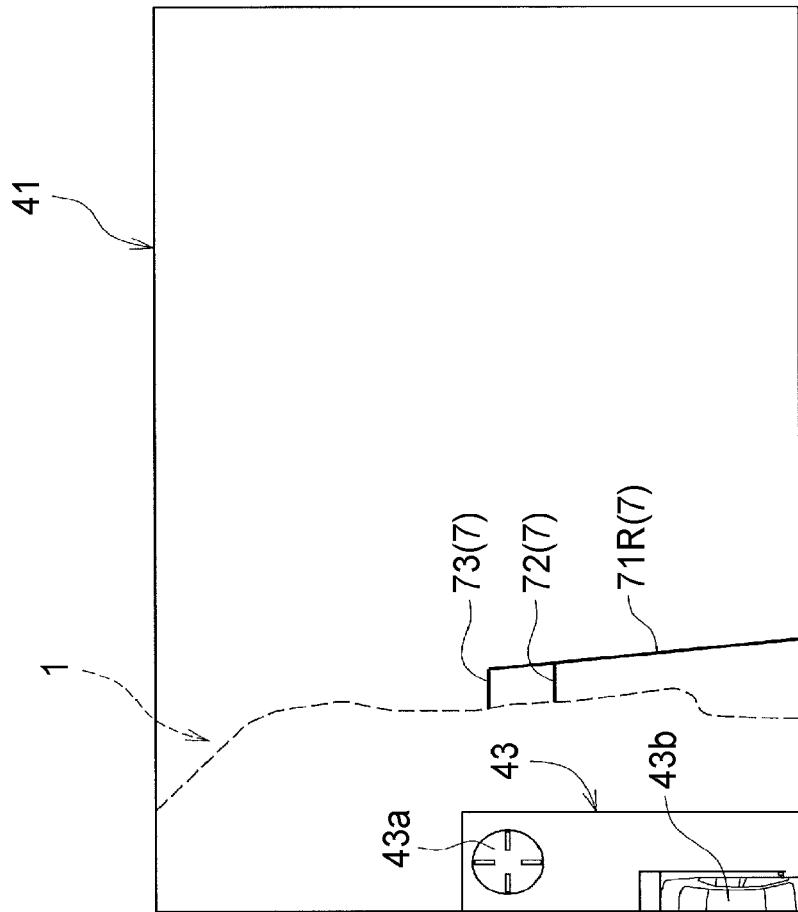
FIG. 8B is a diagram showing the second embodiment and corresponding to FIG. 5B.
Figure 8A:
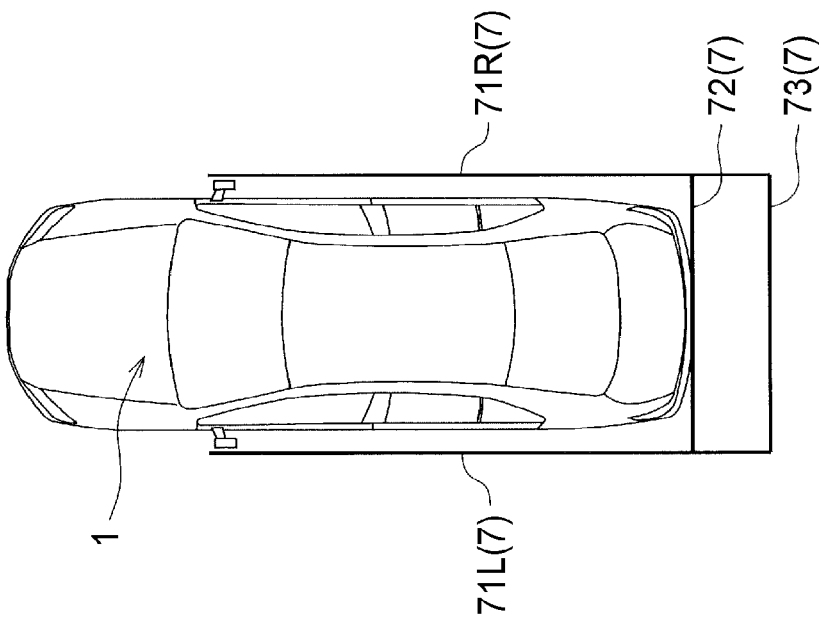
FIG. 8A is a diagram showing a second embodiment and corresponding to FIG. 5A.

FIG. 8A and FIG. 8B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 8A, a vehicle rear edge margin display line 73 is drawn as the assist image 7, in addition to the vehicle-width-directional outermost part display lines 71R, 71L and vehicle rear edge display line 72 in the first embodiment.

The vehicle rear edge margin display line 73 is drawn as a straight line that is obtained when a straight line extending parallel to the vehicle rear edge display line 72 (along the vehicle width direction) on the vehicle rear side of the vehicle rear edge display line 72 is projected on the road surface. More specifically, the vehicle rear edge margin display line 73 is drawn at a position a predetermined distance interval away from the vehicle rear edge display line 72 in the vehicle rearward direction. The vehicle rear edge margin display line 73 is the example of the "assist image expressing an outside position a predetermined distance away from the outermost part of the region in which the vehicle occupies the road surface in the planar view of the vehicle" in the disclosure, and corresponds to the example of the "straight line containing a position of a rear side position a predetermined distance away from the rear edge of the vehicle in the planar view of the vehicle and extending along the vehicle width direction, the position of the rear side position being a position on the road surface when the rear side position is projected on the road surface".

Further, the rear ends (the rear ends in the vehicle front-rear direction) of the vehicle-width-directional outermost part display lines 71R, 71L reach both end positions of the vehicle rear edge margin display line 73 in the vehicle width direction.

The interval between the vehicle rear edge display line 72 and the vehicle rear edge margin display line 73 can be arbitrarily set, and for example, is set to an interval by which a trunk lid of the vehicle 1 does not make contact with a wall surface and the like in the rear of the vehicle when the trunk lid is opened. Therefore, in the case of a vehicle in which a backdoor is greatly moved rearward when the backdoor is opened, as exemplified by a hatchback type vehicle and a one-box type vehicle, the interval between the lines 72, 73 is set to a greater interval than the interval for the sedan type vehicle.

Further, since the vehicle rear edge margin display line 73 is displayed, it is possible to give an approach sense for an obstacle such as a wall that is positioned on the rear side, when the vehicle 1 moves in reverse.

Further, it is preferable that the color of the vehicle rear edge margin display line 73 be set to a different color from the color of the vehicle-width-directional outermost part display lines 71R, 71L and the vehicle rear edge display line 72, for facilitating the discrimination from the vehicle-width-directional outermost part display lines 71R, 71L and the vehicle rear edge display line 72. The color of the vehicle rear edge margin display line 73 may be changed by the operation of the operation key image 43a (or the operation of the mirror control switch or the like).

Third Embodiment

Next, a third embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 9B:
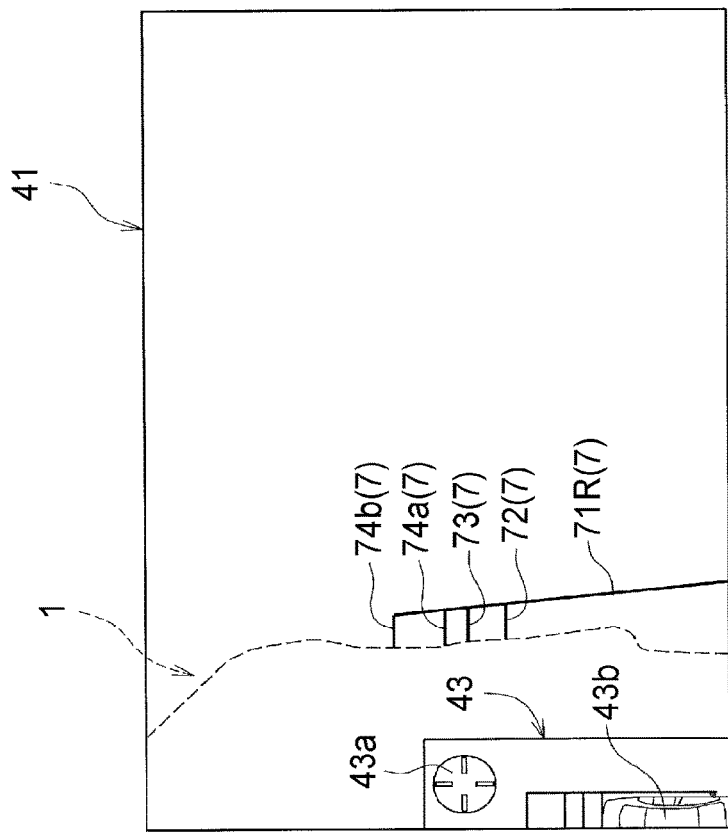
FIG. 9B is a diagram showing the third embodiment and corresponding to FIG. 5B.
Figure 9A:
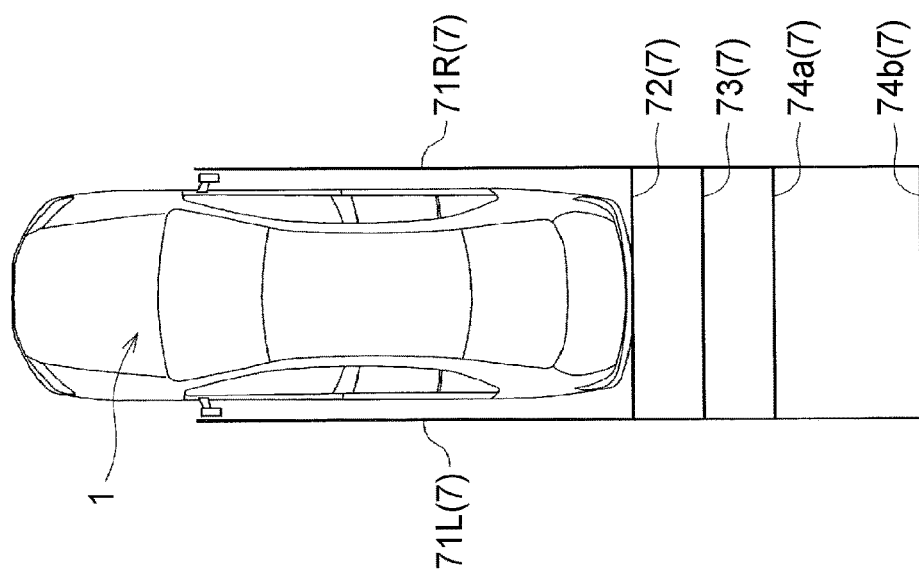
FIG. 9A is a diagram showing a third embodiment and corresponding to FIG. 5A.

FIG. 9A and FIG. 9B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 9A, two rearward approach sense increase lines 74a, 74b are drawn as the assist image 7, in addition to the vehicle-width-directional outermost part display lines 71R, 71L and vehicle rear edge display line 72 in the first embodiment and the vehicle rear edge margin display line 73 in the second embodiment.

The rearward approach sense increase lines 74a, 74b are drawn as straight lines that are obtained when straight lines extending parallel to the vehicle rear edge margin display line 73 (along the vehicle width direction) on the vehicle rear side of the vehicle rear edge margin display line 73 are projected on the road surface. More specifically, the rearward approach sense increase lines 74a, 74b are drawn at positions predetermined distance intervals away from the vehicle rear edge margin display line 73 in the vehicle rearward direction. The intervals among the line 73, 74a, 74b can be arbitrarily set. Each of the rearward approach sense increase lines 74a, 74b also is the example of the "assist image expressing an outside position a predetermined distance away from the outermost part of the region in which the vehicle occupies the road surface in the planar view of the vehicle" in the disclosure, and corresponds to the example of the "straight line containing a position of a rear side position a predetermined distance away from the rear edge of the vehicle in the planar view of the vehicle and extending along the vehicle width direction, the position of the rear side position being a position on the road surface when the rear side position is projected on the road surface".

Further, the rear ends (the rear ends in the vehicle front-rear direction) of the vehicle-width-directional outermost part display lines 71R, 71L reach both end positions of the rearward approach sense increase lines 74a, 74b in the vehicle width direction.

Since the rearward approach sense increase lines 74a, 74b are displayed, it is possible to further give the approach sense for an obstacle such as a wall that is positioned on the rear side, when the vehicle 1 moves in reverse.

Further, it is preferable that the color of the rearward approach sense increase lines 74a, 74b be set to a different color from the colors of the other lines 71R, 71L, 72, 73, for facilitating the discrimination from the lines 71R, 71L, 72, 73. The color of the rearward approach sense increase lines 74a, 74b also may be changed by the operation of the operation key image 43a (or the operation of the mirror control switch or the like).

Further, scales (scales indicating the position in the vehicle front-rear direction) may be displayed on parts of the vehicle-width-directional outermost part display lines 71R, 71L that are positioned on the rear side of the vehicle rear edge margin display line 73. Thereby, it is possible to further give the approach sense for an obstacle such as a wall that is positioned on the rear side.

Fourth Embodiment

Next, a fourth embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 10B:
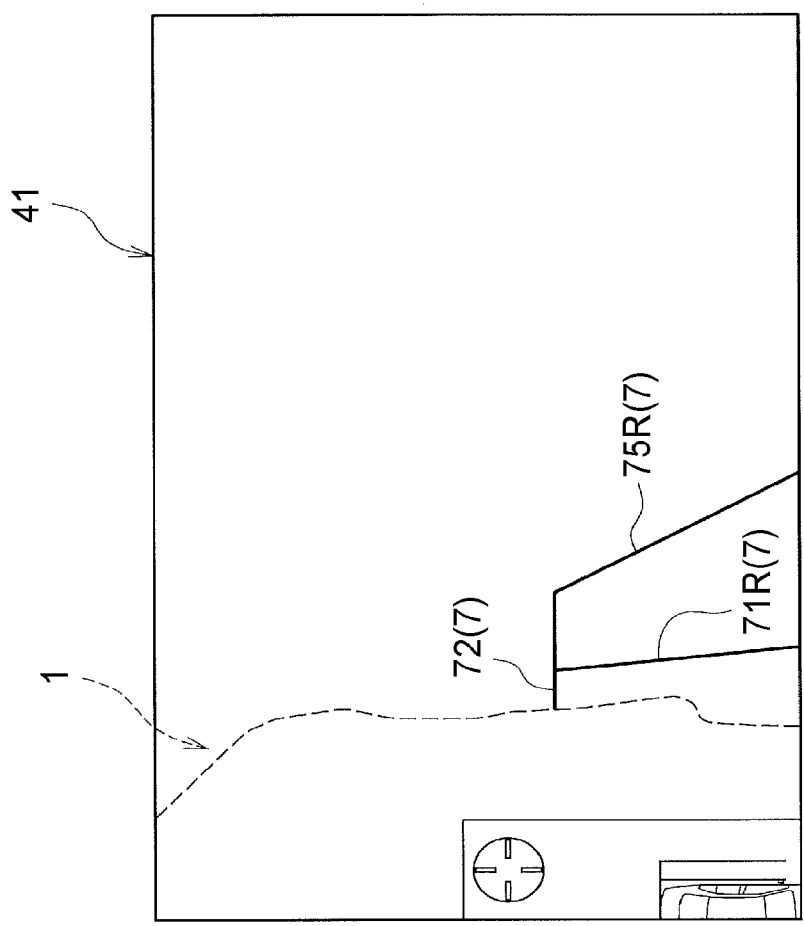
FIG. 10B is a diagram showing the fourth embodiment and corresponding to FIG. 5B.
Figure 10A:
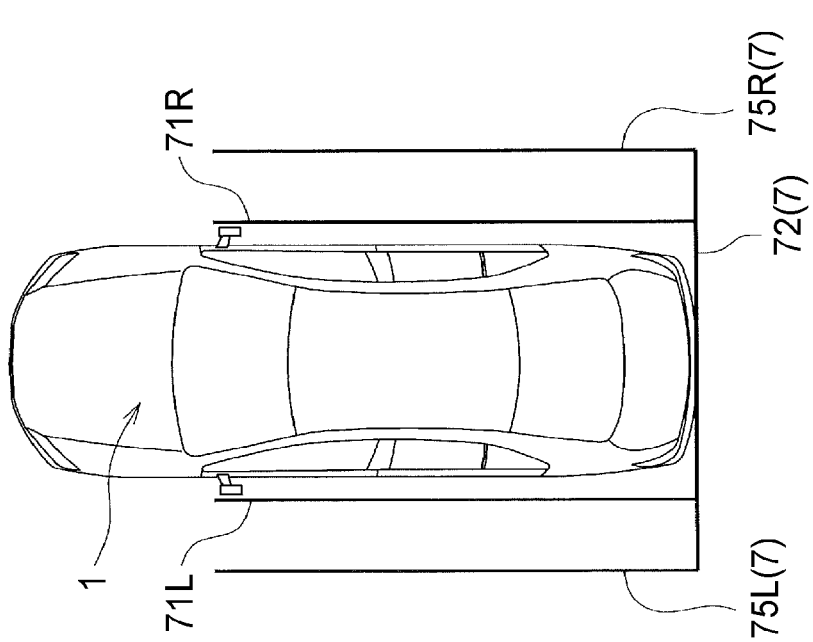
FIG. 10A is a diagram showing a fourth embodiment and corresponding to FIG. 5A.

FIG. 10A and FIG. 10B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 10A, lateral distance sense increase lines 75R, 75L are drawn as the assist image 7, in addition to the vehicle-width-directional outermost part display lines 71R, 71L and vehicle rear edge display line 72 in the first embodiment.

The lateral distance sense increase lines 75R, 75L are drawn as straight lines that are obtained when straight lines extending parallel to the vehicle-width-directional outermost part display lines 71R, 71L (along the vehicle front-rear direction) on the vehicle-width-directional outer sides of the vehicle-width-directional outermost part display lines 71R, 71L are projected on the road surface. More specifically, the lateral distance sense increase lines 75R, 75L are drawn at positions predetermined distance intervals away from the vehicle-width-directional outermost part display lines 71R, 71L in the vehicle-width-directional outward directions. Each of the vehicle-width-directional outermost part display lines 71R, 71L is the example of the "assist image expressing an outside position a predetermined distance away from the outermost part of the region in which the vehicle occupies the road surface in the planar view of the vehicle" in the disclosure, and corresponds to the example of the "straight line containing a position of an outside position a predetermined distance away from the outside edge of the pickup means in the vehicle width direction in the planar view of the vehicle and extending along the vehicle front-rear direction, the position of the outside position being a position on the road surface when the outside position is projected on the road surface".

The interval between the lines 75R, 71R (75L, 71L) can be arbitrarily set, and for example, is set to an interval by which the front-side doors 12, 13 of the vehicle 1 do not make contact with wall surfaces and the like on the lateral sides of the vehicle 1 at the time of the opening of the front-side doors 12, 13 (at the time of the opening at the first step when the front-side doors 12, 13 are opened in two steps (when a moderation feeling is kept in the middle of the opening)). Thereby, when the vehicle 1 is parked at a position where the lateral distance sense increase lines 75R, 75L are away from the lower edges of walls, it is possible to obtain a suitable boarding and alighting property of the vehicle 1. Further, the inclination angles of the lateral distance sense increase lines 75R, 75L to be displayed on the display devices 41, 42 (the inclination angles with respect to the top-bottom direction of the display devices 41, 42) are set to angles greater than the inclination angles of the vehicle-width-directional outermost part display lines 71R, 71L. Thereby, it is possible to express perspective (depth sense), and it is possible to easily inform the driver that each assist image 7 (71R, 71L, 72, 75R, 75L) is drawn by the projection on the road surface.

Fifth Embodiment

Next, a fifth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 11A and FIG. 11B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 11A, the vehicle-width-directional outermost part display lines 71R, 71L and vehicle rear edge display line 72 in the first embodiment, the vehicle rear edge margin display line 73 in the second embodiment, the rearward approach sense increase lines 74a, 74b in the third embodiment, and the lateral distance sense increase line 75R, 75L in the fourth embodiment are drawn as the assist image 7.

In the embodiment, it is possible to exert the effects of the above-described embodiments concurrently.

Sixth Embodiment

Next, a sixth embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 12B:
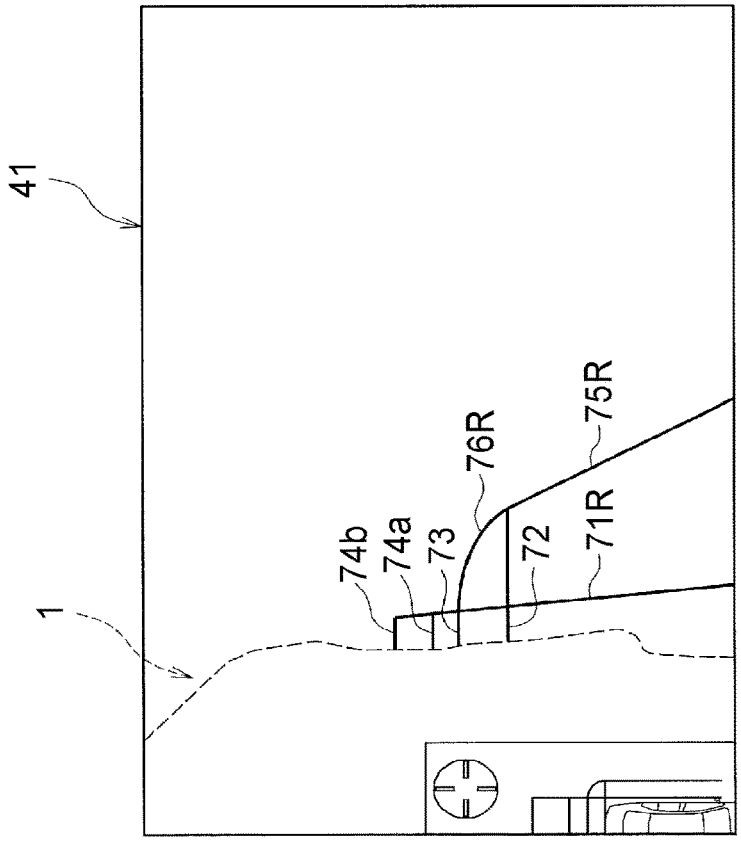
FIG. 12B is a diagram showing the sixth embodiment and corresponding to FIG. 5B.
Figure 12A:
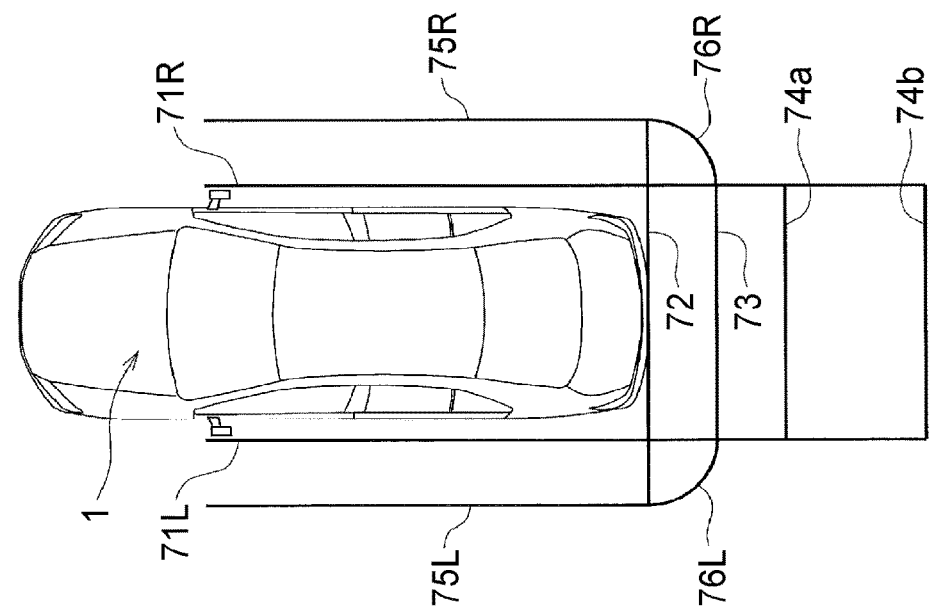
FIG. 12A is a diagram showing a sixth embodiment and corresponding to FIG. 5A.

FIG. 12A and FIG. 12B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 12A, similarly to the fifth embodiment, the vehicle-width-directional outermost part display lines 71R, 71L, the vehicle rear edge display line 72, the vehicle rear edge margin display line 73, the rearward approach sense increase lines 74a, 74b, and the lateral distance sense increase lines 75R, 75L are drawn as the assist image 7.

In the embodiment, the rear ends of the lateral distance sense increase lines 75R, 75L and the vehicle-width-directional outer ends of the vehicle rear edge margin display line 73 are connected by arc-like body circumference lines 76R, 76L. The body circumference lines 76R, 76L face right and left corner parts of the rear bumper of the vehicle 1, and are drawn as lines that are obtained when positions a predetermined distance away from the right and left corner parts of the rear bumper in the horizontal direction are projected on the road surface.

Thereby, the lateral distance sense increase lines 75R, 75L are not displayed on the rear side of the vehicle rear edge margin display line 73, and the vehicle rear edge margin display line 73 and the rearward approach sense increase lines 74a, 74b are not displayed on the vehicle-width-directional outer sides of the lateral distance sense increase lines 75R, 75L. Therefore, it is possible to restrain the display manner of the assist image 7 from being complicated, and it is possible to increase the visibility of the display devices 41, 42.

Figure 13A:
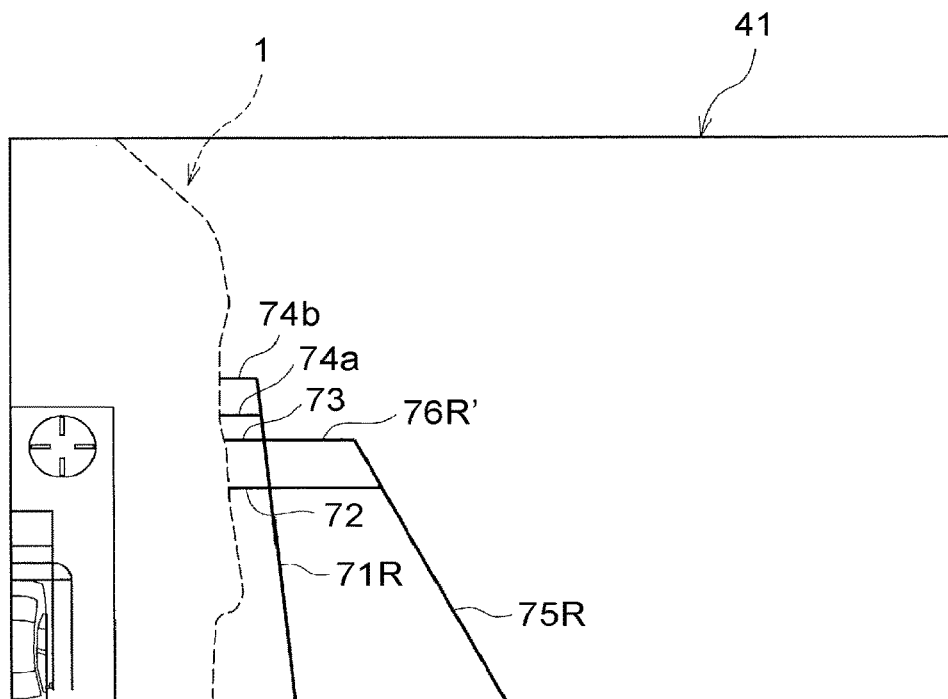
FIG. 13A is a diagram showing a modification of a body circumference line and corresponding to FIG. 5B.
Figure 13B:
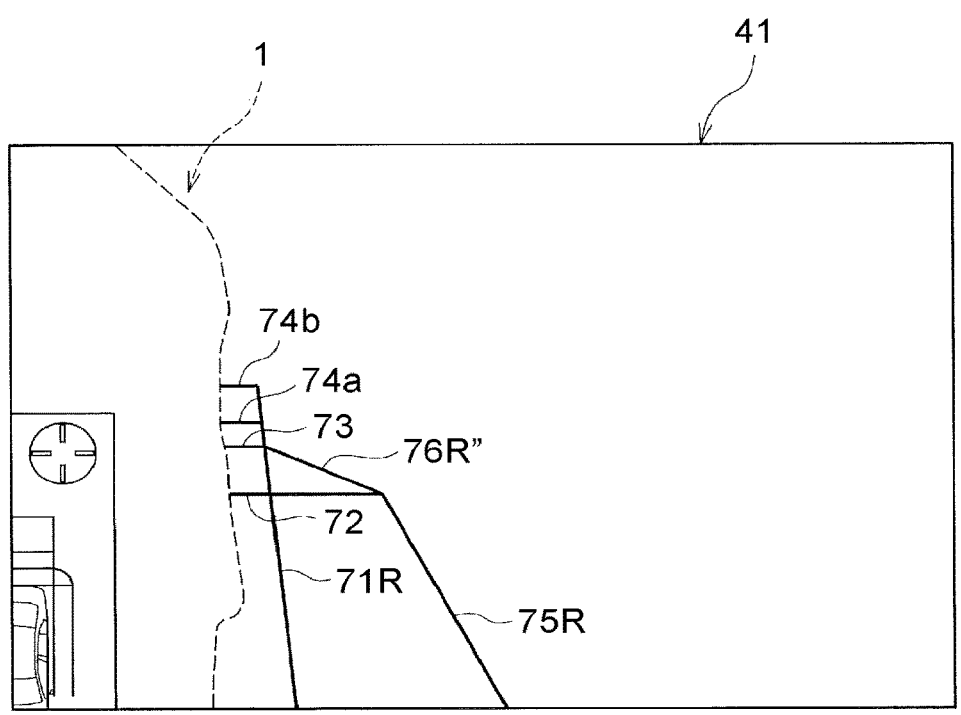
FIG. 13B is a diagram showing a modification of the body circumference line and corresponding to FIG. 5B.

Without being limited to the arc form, the body circumference lines 76R, 76L may be formed by straight lines 76R' extending along the vehicle width direction and the vehicle front-rear direction (straight lines extending along the vehicle width direction and straight lines extending along the vehicle front-rear direction) as shown in FIG. 13A, or may be formed by straight lines 76R" inclined to the inside in the vehicle width direction toward the vehicle rearward direction as shown in FIG. 13B.

Seventh Embodiment

Next, a seventh embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 14A and FIG. 14B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 14A, compared to the sixth embodiment, the rearward approach sense increase lines 74a, 74b are not displayed as the assist image 7.

Its purpose is to decrease the ratio of the area of the assist image 7 to the whole area of each of the display devices 41, 42, for complying with laws in countries.

In the display image on the right-side display device 41 shown in FIG. 14B, the vehicle-width-directional outermost part display lines 71R, 71L, the vehicle rear edge display line 72, and the body circumference lines 76R, 76L are displayed. It is possible to assist the grasp of the distance sense and the depth sense through the assist image 7, while complying with the laws, and thereby, it is possible to increase the practical utility of the electronic mirror apparatus 2.

Eighth Embodiment

Next, an eighth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 15A and FIG. 15B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 15A, compared to the first embodiment, tire rear end lines 77R, 77L are added as the assist image 7.

Each of the tire rear end lines 77R, 77L is a straight line on the assumption that a straight line containing the position on the road surface of the rear end of the rear tire when the rear end of the rear tire is projected on the road surface and extending along the vehicle width direction is drawn on the road surface.

Figure 16:
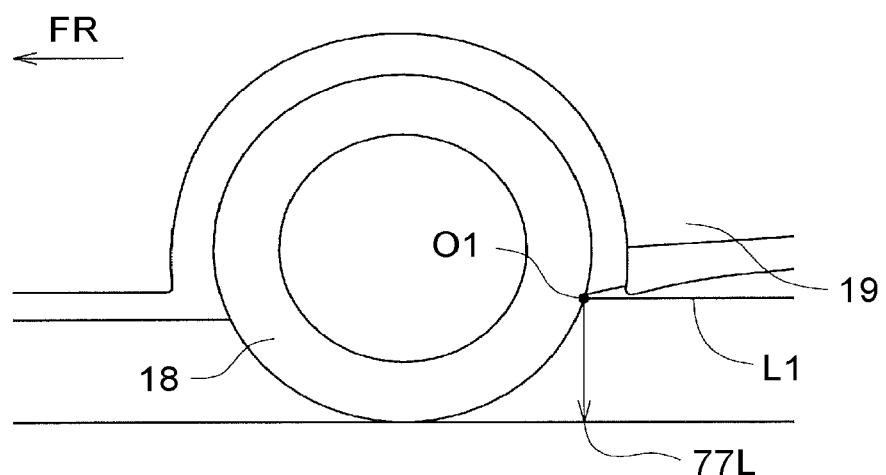
FIG. 16 is a diagram of a rear tire of the vehicle and the periphery of the rear tire, as viewed from the lateral side.

As shown in FIG. 16 (FIG. 16 is a diagram of a rear tire 18 of the vehicle and the periphery of the rear tire 18 as viewed from the lateral side, in which an arrow FR indicates the vehicle forward direction), the rear end of the rear tire described herein is an intersection point O1 between a straight line L1 containing a lower end of a rear fender 19 of the vehicle 1 and extending along the vehicle front-rear direction and an outer edge of the rear tire 18. Each of the tire rear end lines 77R, 77L is a straight line on the assumption that a straight line containing the position on the road surface of the intersection point O1 when the intersection point O1 is projected on the road surface (see an arrow indicating the tire rear end line 77R in FIG. 16) and extending along the vehicle width direction is drawn on the road surface.

The embodiment is effective when the vehicle 1 is stopped at a position where the rear tire 18 abuts on a wheel block (generally, a wheel block having a lower height than the height position of the lower end of the rear fender 19) or the like, at the time of the reverse traveling of the vehicle 1. That is, the rear tire 18 abuts on the wheel block, at the time when the tire rear end lines 77R, 77L roughly coincide with the position of the wheel block (the case where the height dimension of the wheel block is comparable to the height position of the lower end of the rear fender 19). Alternatively, the rear tire 18 abuts on the wheel block, slightly after the time when the tire rear end lines 77R, 77L coincide with the position of the wheel block (the case where the height dimension of the wheel block is lower than the height position of the lower end of the rear fender 19). Therefore, it is possible to grasp the timing of the abutting and perform a driving operation of the vehicle 1, and it is possible to perform a driving operation allowing the relaxation of the shock when the rear tire 18 abuts on the wheel block. Thereby, it is possible to restrain the damage to the rear tire 18. Further, since it is possible to grasp the rear end position of the rear tire 18, it is possible to support a driving operation by which the rear tire 18 is avoided from falling into a gutter. Further, for example, when the vehicle 1 is moved to a curbstone on a sidewalk or the like, it is possible to support a driving operation by which the rear tire 18 is avoided from colliding with the curbstone.

When the rear tire 18 is replaced or when the rear fender 19 is replaced with a rear fender having a different shape, the rear end position of the rear tire 18 changes. Therefore, depending on the change, the position and line length of the tire rear end lines 77R, 77L may be changed (by the operation of the operation key image 43a).

Ninth Embodiment

Next, a ninth embodiment will be described. Similarly to the eighth embodiment, the embodiment displays an assist image that makes it easy for the driver to recognize the position of the rear tire 18.

FIG. 17A is a diagram of the rear tire 18 and the periphery of the rear tire 18 as viewed from the lateral side (the arrow FR indicates the vehicle forward direction), and FIG. 17B is a diagram showing a display image on the right-side display device 41.

The assist image 7 in the embodiment includes straight lines (the tire rear end line 77R, a tire center line 77R' and a tire front end line 77R") on the assumption that straight lines containing the positions on the road surface of a front end position O2, the center position O3 and the rear end position O4 in the rear tire 18 when the front end position O2, center position O3 and rear end position O4 are projected on the road surface and extending along the vehicle width direction are drawn on the road surface.

Also in the embodiment, similarly to the eighth embodiment, it is possible to grasp the timing when the rear tire 18 abuts on the wheel block at the time of the reverse traveling of the vehicle 1, and it is possible to perform a driving operation allowing the relaxation of the shock when the rear tire 18 abuts on the wheel block. Thereby, it is possible to restrain the damage to the rear tire 18. Further, it is possible to support a driving operation by which the rear tire 18 is avoided from falling into a gutter and a driving operation by which the rear tire 18 is avoided from colliding with the curbstone.

Figure 18:
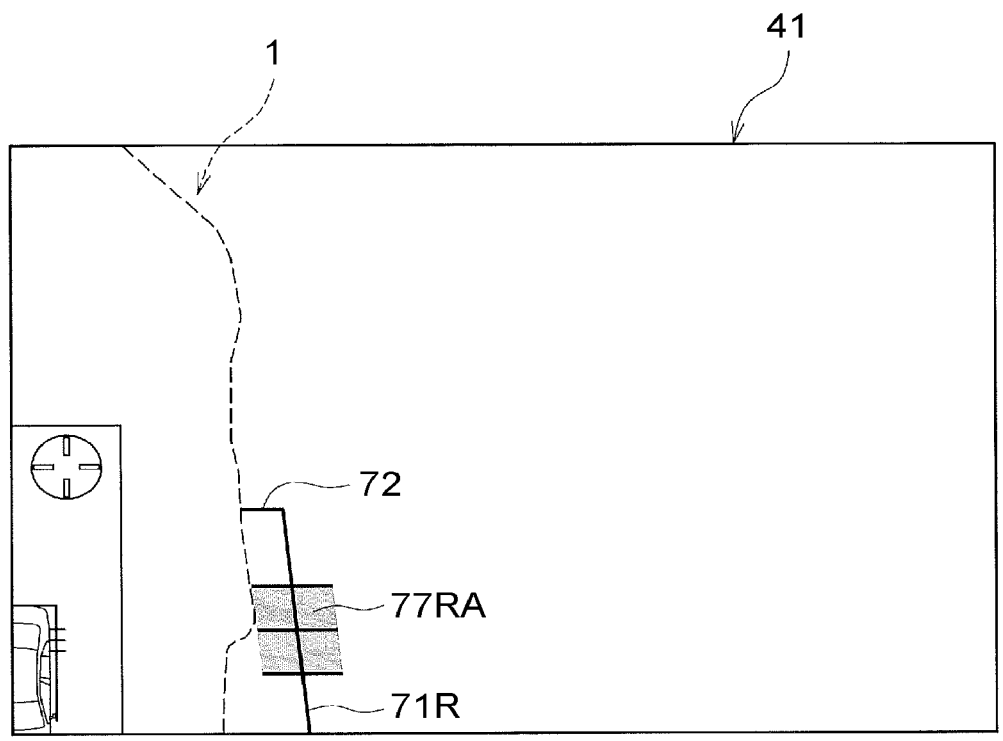
FIG. 18 is a diagram showing a modification of the ninth embodiment and corresponding to FIG. 5B.

FIG. 18 is a diagram showing a display image on the right-side display device 41 in a modification of the ninth embodiment. In the modification, the range from the front end position to the rear end position in the rear tire 18 is displayed as a rectangular assist image 77RA. Also in the modification, it is possible to exert the same effect described above. The inside of the rectangular assist image 77RA showing the range of the rear tire 18 may have a gradation, for increasing the visibility.

Tenth Embodiment

Next, a tenth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 19A and FIG. 19B are diagrams for describing the assist image 7 in the embodiment and are diagrams corresponding to FIG. 5A and FIG. 5B.

In the embodiment, the assist image 7 is changed depending on the steering angle of the steering wheel 14 that is detected by the steering angle sensor 62.

FIG. 19A and FIG. 19B shows a case where the steering wheel 14 is steered in the rightward direction and the vehicle is turned to the right side in FIG. 19A at the time of the reverse traveling of the vehicle 1.

In this case, the vehicle-width-directional outermost part display lines 71R, 71L and the lateral distance sense increase lines 75R, 75L are displayed so as to be curved to the right side in the vehicle rearward direction. In this case, each curvature of the curved lines increases as the steering angle of the steering wheel 14 increases.

The vehicle rear edge display line 72 and the vehicle rear edge margin display line 73 are displayed so as to extend in horizontal directions orthogonal to tangential lines of the curved vehicle-width-directional outermost part display lines 71R, 71L and lateral distance sense increase lines 75R, 75L.

In the embodiment, since the assist image 7 is changed depending on the steering angle of the steering wheel 14, it is possible to increase the predictability of traveling.

In FIG. 19B, the lines when the steering angle of the steering wheel 14 is "0" are displayed as broken lines.

On the display device on the outside of turning (the left-side display device 42 in FIG. 19), there is a possibility that the curved vehicle rear edge display line 72 and vehicle rear edge margin display line 73 are hidden by the body. Therefore, the display of the vehicle rear edge display line 72 and the vehicle rear edge margin display line 73 may be kept on the display device on the outside of turning (the display when the steering angle of the steering wheel 14 is "0" may be maintained), and the display of the vehicle rear edge display line 72 and the vehicle rear edge margin display line 73 may be changed only on the display device on the inside of turning.

Eleventh Embodiment

Next, an eleventh embodiment will be described. Also in the embodiment, similarly to the tenth embodiment, the assist image 7 is changed depending on the steering angle of the steering wheel 14 that is detected by the steering angle sensor 62.

Figure 20:
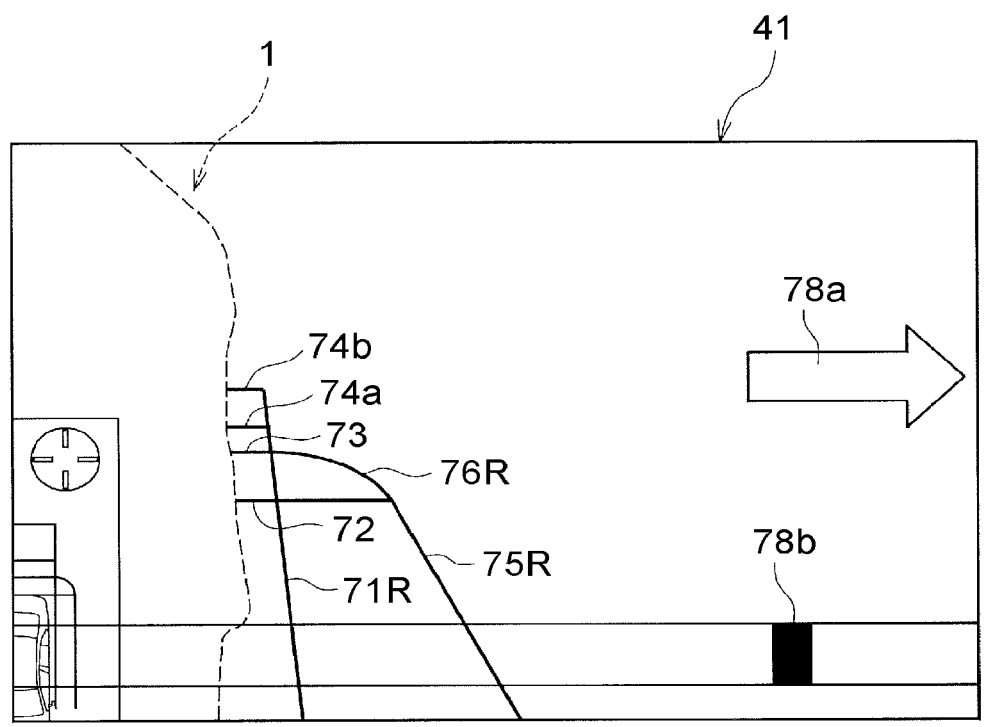
FIG. 20 is a diagram showing an eleventh embodiment and corresponding to FIG. 5B.

FIG. 20 is a diagram showing a display image on the right-side display device 41.

In the assist image 7 in the embodiment, an arrow 78a is displayed so as to be oriented in the traveling direction (turning direction) of the vehicle 1 depending on the steering angle of the steering wheel 14. The arrow 78a may be displayed such that the length of the arrow 78a increases as the steering angle of the steering wheel 14 increases. Further, a display bar 78b indicating the traveling direction (turning direction) of the vehicle 1 depending on the steering angle of the steering wheel 14 is displayed at a lower part of the right-side display device 41.

Also in the embodiment, similarly to the tenth embodiment, it is possible to increase the predictability of traveling.

Twelfth Embodiment

Next, a twelfth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 21A and FIG. 21B are diagrams for describing the assist image 7 in the embodiment and are diagrams corresponding to FIG. 5A and FIG. 5B.

In the embodiment, when an obstacle X exists diagonally in the rear of the vehicle 1, an assist image showing the position of the obstacle X is displayed on the display device 41.

Figure 22:
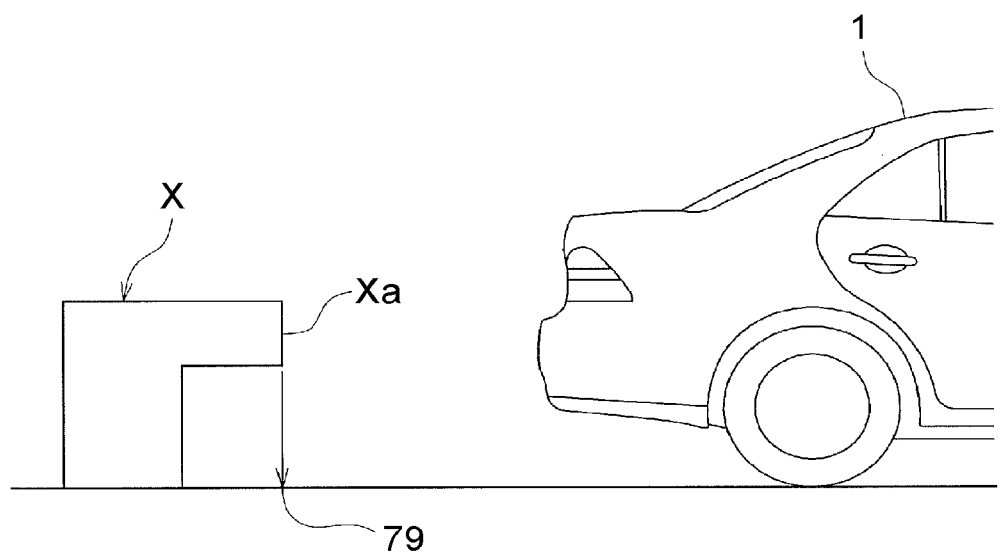
FIG. 22 is a diagram showing a state where the vehicle has moved in reverse close to an obstacle in the twelfth embodiment.

For example, as shown in FIG. 22 (FIG. 22 is a diagram showing the vehicle 1 and the obstacle X), when an end part Xa of the obstacle X on the vehicle 1 side is at a position away from the road surface (when the end part Xa of the obstacle X is above the road surface), it is difficult to grasp the distance between the end part Xa of the obstacle X and the rear edge of the vehicle 1 by visual observation. However, the embodiment detects the position of the end part Xa of the obstacle X, with a clearance sonar (not illustrated) disposed on a rear part (for example, the rear bumper) of the vehicle 1, and displays an image on the assumption that the form of the end part Xa of the obstacle X on the road surface when the end part Xa of the obstacle X is projected on the road surface (a straight line shown in FIG. 21A and FIG. 21B; see a straight line 79 in FIG. 21A and FIG. 21B) is drawn on the road surface.

In the embodiment, regardless of the shape of the obstacle X, it is possible to easily grasp the distance between the end part Xa of the obstacle X on the vehicle 1 side and the rear edge of the vehicle 1, and it is possible to perform a driving of the vehicle 1 by which the contact with the obstacle X is avoided.

Further, for example, a line (for example, the body circumference line 76R) that is of the plurality of lines constituting the assist image 7 and that is closest to the obstacle X may be blinked, for giving a warning notice to the driver.

Thirteenth Embodiment

Next, a thirteenth embodiment will be described. Also in the embodiment, similarly to the twelfth embodiment, when an obstacle exists diagonally in the rear of the vehicle 1, an assist image showing the position of the obstacle is displayed on the display device 41.

FIG. 23A and FIG. 23B are diagrams for describing the assist image 7 when obstacles X2, X3 exist in the right rear of the vehicle 1 in the embodiment and are diagrams corresponding to FIG. 5A and FIG. 5B.

In the assist image 7 in the embodiment, the height dimensions of the obstacles X2, X3 are detected by the clearance sonar disposed on a rear part (for example, the rear bumper) of the vehicle 1, and the display colors of the obstacles X2, X3 are changed depending on the height dimensions of the obstacles X2, X3. That is, when an upper end position of the obstacle X2 as the height of the obstacle X2 is lower than a lower end position of the rear fender, there is a possibility that the obstacle X2 abuts on the rear tire without abutting on the rear fender. On the other hand, when an upper end position of the obstacle X3 as the height of the obstacle X3 is higher than the lower end position of the rear fender, there is a possibility that the obstacle X3 abuts on the rear fender.

In consideration of this point, the obstacle X2 in which the upper end position is lower than the lower end position of the rear fencer is displayed in yellow, for a relatively-low-level warning notice, and the obstacle X3 in which the upper end position is higher than the lower end position of the rear fender is displayed in red, for a relatively-high-level warning notice. The colors are not limited to these, and can be arbitrarily set.

Thereby, the height dimensions of the obstacles X2, X3 that are hard to determine from the pickup image can be easily recognized by color-coding of the obstacles X2, X3. The driver can perform a driving operation for moving the vehicle 1 in reverse, while recognizing the heights of the obstacles X2, X3.

Fourteenth Embodiment

Next, a fourteenth embodiment will be described. Also in the embodiment, similarly to the twelfth embodiment and the thirteenth embodiment, when an obstacle exists diagonally in the rear of the vehicle 1, an assist image showing the position of the obstacle is displayed on the display device 41.

Figure 24A:
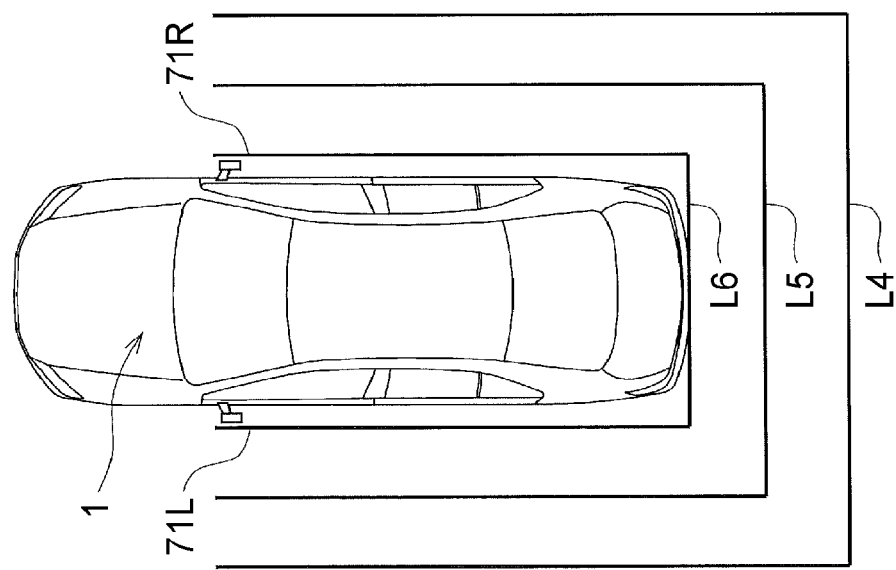
FIG. 24A is a diagram showing a fourteenth embodiment and corresponding to FIG. 5A.
Figure 24B:
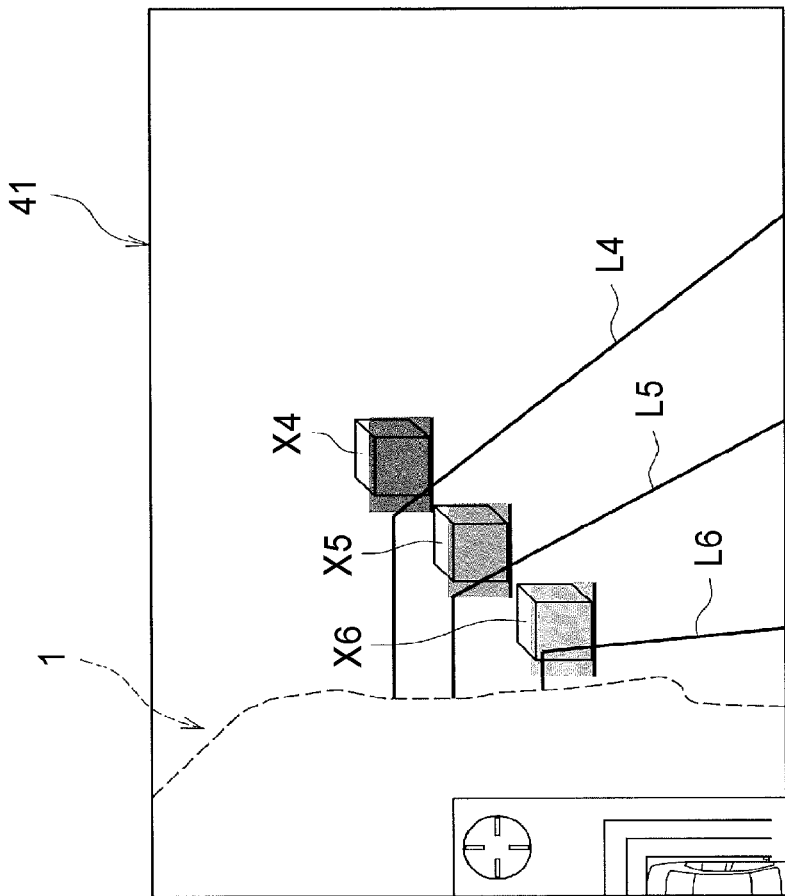
FIG. 24B is a diagram showing the fourteenth embodiment and corresponding to FIG. 5B.

FIG. 24A and FIG. 24B are diagrams for describing the assist image 7 in the embodiment and are diagrams corresponding to FIG. 5A and FIG. 5B.

In the assist image 7 in the embodiment, the display colors of obstacles X4 to X6 (see FIG. 24B) are changed depending on the distances between the vehicle 1 and the obstacles X4 to X6. That is, when the distance between the vehicle 1 and the obstacle X4 is relatively long (for example, about 500 mm), the obstacle X4 is displayed in blue, for a relatively-low-level warning notice. When the distance between the vehicle 1 and the obstacle X5 is relatively short (for example, about 300 mm), the obstacle X5 is displayed in yellow, for a relatively-high-level warning notice. When the distance between the vehicle 1 and the obstacle X6 is very short (for example, about 100 mm), the obstacle X6 is displayed in red, for a highest-level warning notice. The distances and the colors depending on the distances are not limited to these, and can be arbitrarily set. In FIG. 24A and FIG. 24B, arrangement regions for the obstacles X4 to X6 are distinguished by three region lines L4, L5, L6, and the display colors of the obstacles X4 to X6 are changed depending on the arrangement region for the obstacles X4 to X6.

Thereby, the driver can perform a driving operation for moving the vehicle 1 in reverse, while recognizing the distances between the vehicle 1 and the obstacles X4 to X6.

Fifteenth Embodiment

Next, a fifteenth embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 25A:
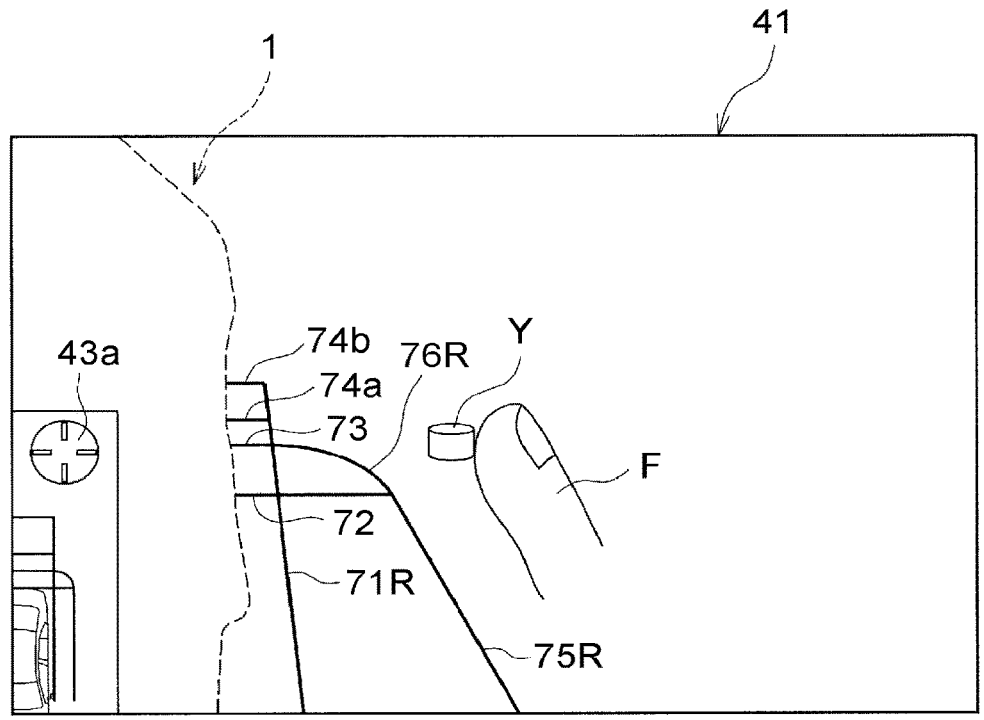
FIG. 25A is a diagram showing a fifteenth embodiment and corresponding to FIG. 5A.
Figure 25B:
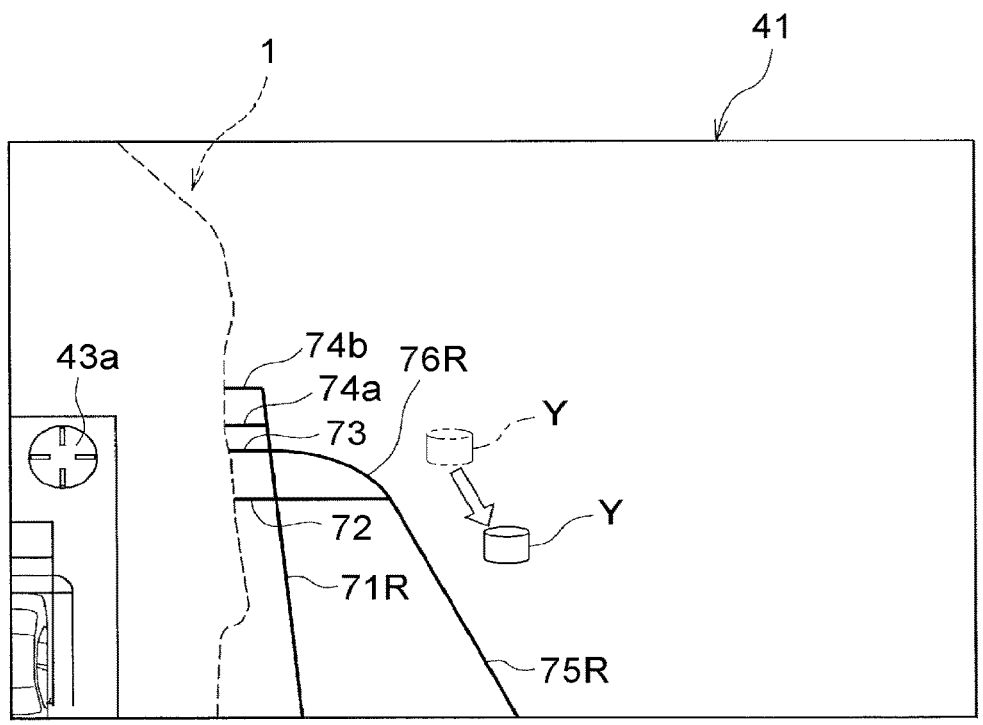
FIG. 25B is a diagram showing the fifteenth embodiment and corresponding to FIG. 5B.

FIG. 25A and FIG. 25B are diagrams for describing the assist image 7 in the embodiment and are diagrams corresponding to FIG. 5B.

In the embodiment, using a configuration in which each of the display devices 41, 42 is a touch panel type display device, an image (mark) Y that is a sign can be additionally displayed on each road surface image of the display devices 41, 42, by an operation of the touch panel.

Specifically, as shown in FIG. 25A, the occupant touches a position on the right-side display device 41, with a finger F, and thereby, the image Y that is a sign is displayed at the position. The mark Y is a sign put on the road surface, and moves together with the road surface, in conjunction with the relative movement of the road surface on the screen of the right-side display device 41.

Therefore, when the vehicle 1 moves in reverse in a state where the mark Y is displayed on the screen of the right-side display device 41 as shown in FIG. 25A, the road surface moves to the lower side on the screen of the right-side display device 41, and in conjunction with the movement, the mark Y also moves to the lower side on the screen of the right-side display device 41.

In the embodiment, since the mark Y functions as a guide to a parking place for the vehicle 1, it is possible to support a driving operation for parking.

In the embodiment, the mark Y that is a sign is additionally displayed on each road surface image of the display devices 41, 42, by the operation of the touch panel. However, the mark Y that is a sign may be additionally displayed on the road surface image, by the operation of the operation key image 43a (or the operation of the mirror control switch).

The mark Y is not limited to the columnar mark shown in FIG. 25A and FIG. 25B, and may be a so-called traffic cone, a blinking animation, or the like. The mark Y may be a semitransparent mark that can transmit the background. The contrast between the mark Y and the other part may be increased for increase in visibility.

Sixteenth Embodiment

Next, a sixteenth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 26A and FIG. 26B are diagrams for describing the assist image 7 in the embodiment and are diagrams corresponding to FIG. 5A and FIG. 5B.

In the embodiment, a plurality of markers Z1, Z2, Z3 installed on the road surface or implanted into the road surface is recognized, and images of straight lines L2 connecting the markers Z1, Z2, Z3 when the straight lines L2 are projected on the road surface are added and displayed (additionally displayed), as the assist image 7.

For example, the markers Z1, Z2, Z3 that generates magnetic or electromagnetic signals are implanted into the road surface. A receiver that receives the magnetic or electromagnetic signal sent from the markers Z1, Z2, Z3 is provided, and the implantation positions of the markers Z1, Z2, Z3 are grasped. Then, the straight lines L2 connecting the markers Z1, Z2, Z3 when the straight lines L2 are projected on the road surface are displayed on each of the display devices 41, 42, as the assist image 7.

In FIG. 26B, a marker Z2' displayed sterically is displayed at a corner part of the assist image 7. Thereby, the driver can acutely recognize the corner part of the region surrounded by the assist image 7.

The embodiment can be used for making the driver recognize a region where the vehicle 1 is frequently parked, for example, a parking space of driver's home. That is, a box for the parking space is displayed on each of the display devices 41, 42, without actually drawing the box for the parking space on the road surface, and thereby, the driver can recognize the parking space in the parking place.

Seventeenth Embodiment

Next, a seventeenth embodiment will be described. Also in the embodiment, similarly to the sixteenth embodiment, a virtual box is displayed on each of the display devices 41, 42.

Figure 27A:
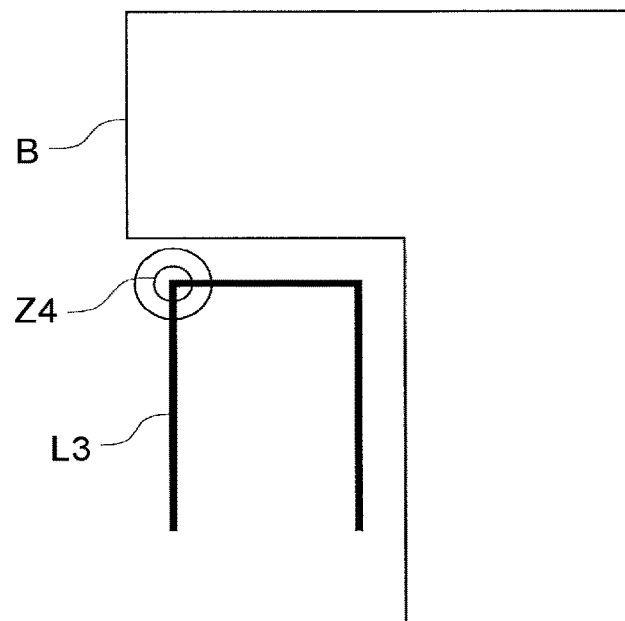
FIG. 27A is a diagram for describing an assist image in a seventeenth embodiment, and is a diagram showing a box form of a parking space for the vehicle.
Figure 27B:
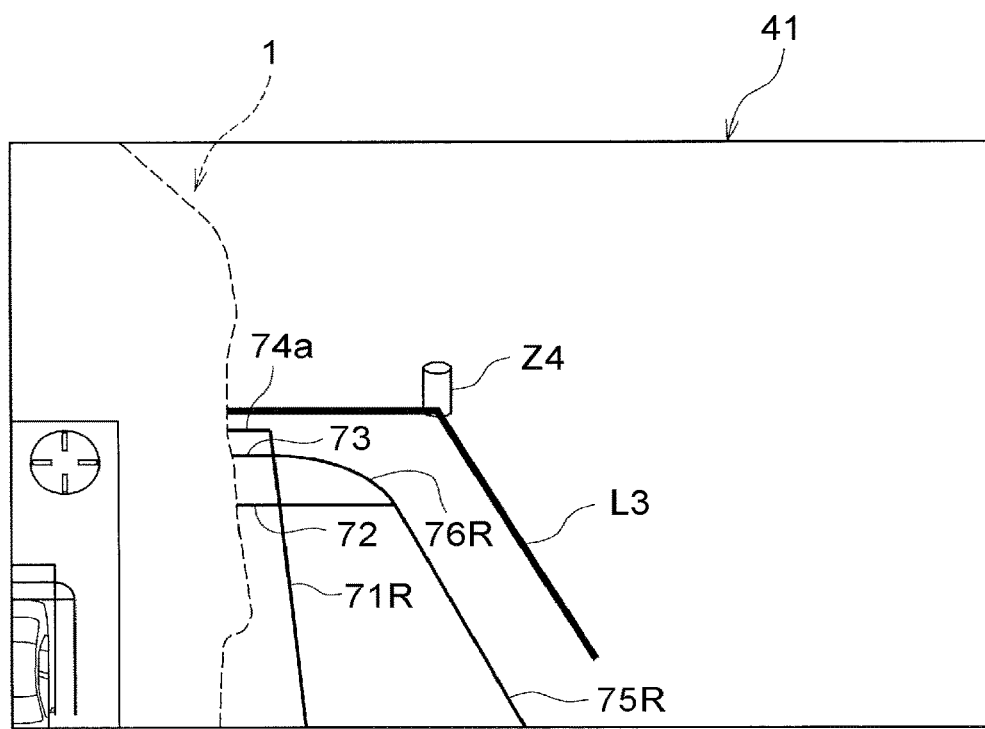
FIG. 27B is a diagram for describing the assist image in the seventeenth embodiment, and is a diagram showing a display image on the right-side display device.

FIG. 27A and FIG. 27B are diagrams for describing the assist image 7 in the embodiment and are diagrams corresponding to FIG. 5A and FIG. 5B.

In the assist image 7 in the embodiment, a point or a line is drawn on a map screen of the car navigation or a map screen of a smartphone carried by the driver, and by the communication with the car navigation or the smartphone, the point or the line is additionally displayed on each of the display devices 41, 42. That is, in cooperation with a GPS function of the device, the point or the line is additionally displayed on each of the display devices 41, 42. As an example, FIG. 27A and FIG. 27B show a case of drawing a box form (see straight lines L3 showing a box) as a parking space for the vehicle 1, adjacent to a building B displayed on the map screen of the car navigation or the map screen of the smartphone carried by the driver. FIG. 27A shows the parking space on the map screen, and FIG. 27B shows a display image on the right-side display device 41 at this time. In FIG. 27A and FIG. 27B, a marker Z4 displayed sterically is displayed at a corner part of the parking space.

Also in the embodiment, the box (straight lines L3) for the parking space is displayed on each of the display devices 41, 42, without actually drawing the box L3 for the parking space on the road surface, and thereby, the driver can recognize the parking space in the parking place.

Eighteenth Embodiment

Next, an eighteenth embodiment will be described. Also in the embodiment, the display manner of the assist image 7 is different from that in the first embodiment. The other configuration and behavior are the same as those in the first embodiment, and therefore, only the display manner of the assist image 7 will be described.

FIG. 28A and FIG. 28B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

In the embodiment, lines are not displayed at parts where the vehicle-width-directional outermost part display lines 71R, 71L and the vehicle rear edge display line 72 intersect.

In the embodiment, since lines are not displayed at the parts where the vehicle-width-directional outermost part display lines 71R, 71L and the vehicle rear edge display line 72 intersect, the background image (the image of the range from the vehicle lateral direction to the vehicle rearward direction) is easily recognized.

Figure 29:
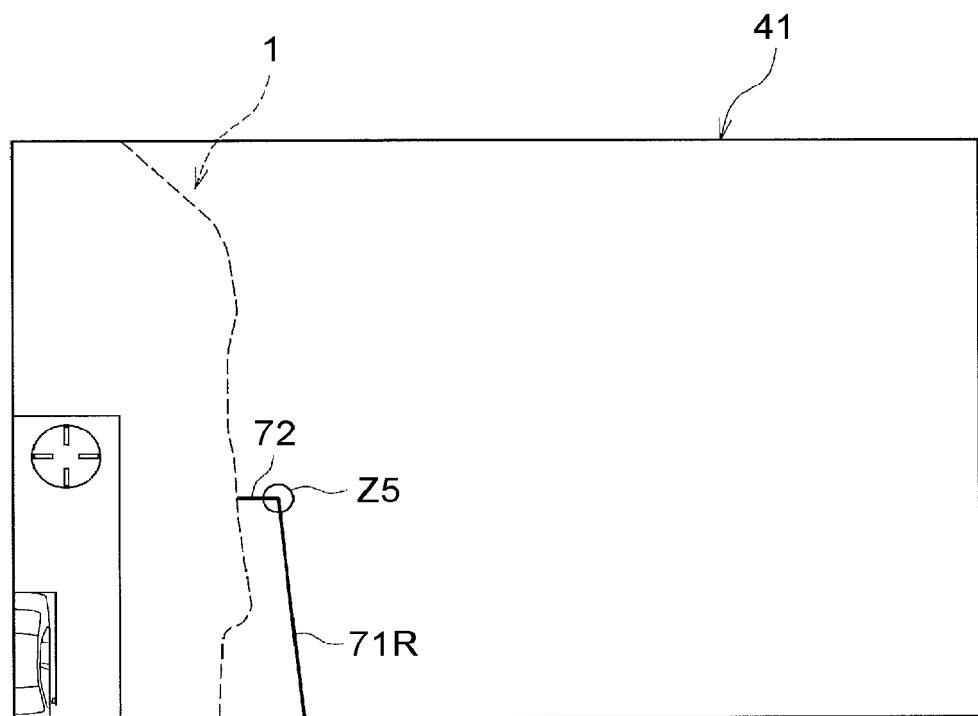
FIG. 29 is a diagram showing a modification of the eighteenth embodiment and corresponding to FIG. 5B.

FIG. 29 is a diagram showing a modification of the eighteenth embodiment and showing a display image on the right-side display device 41. In the modification, a marker Z5 is displayed at parts where the vehicle-width-directional outermost part display lines 71R, 71L and the vehicle rear edge display line 72 intersect, and thereby, the intersection points of the lines 71R, 71L, 72 are emphasized. By blinking the marker Z5, it is possible to further emphasize the intersection points of the lines 71R, 71L, 72.

Nineteenth Embodiment

Next, a nineteenth embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 30B:
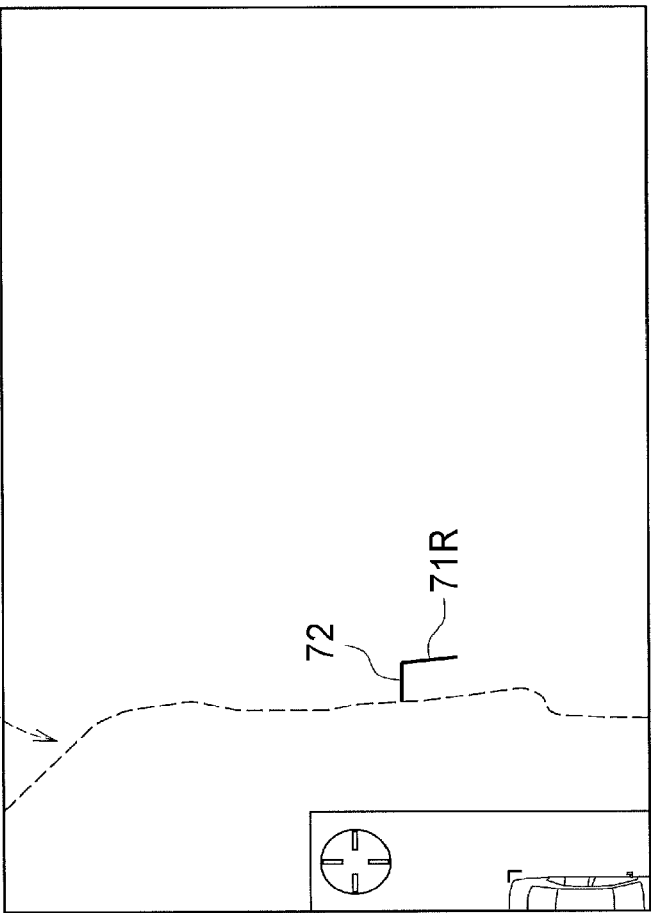
FIG. 30B is a diagram showing the nineteenth embodiment and corresponding to FIG. 5B.
Figure 30A:
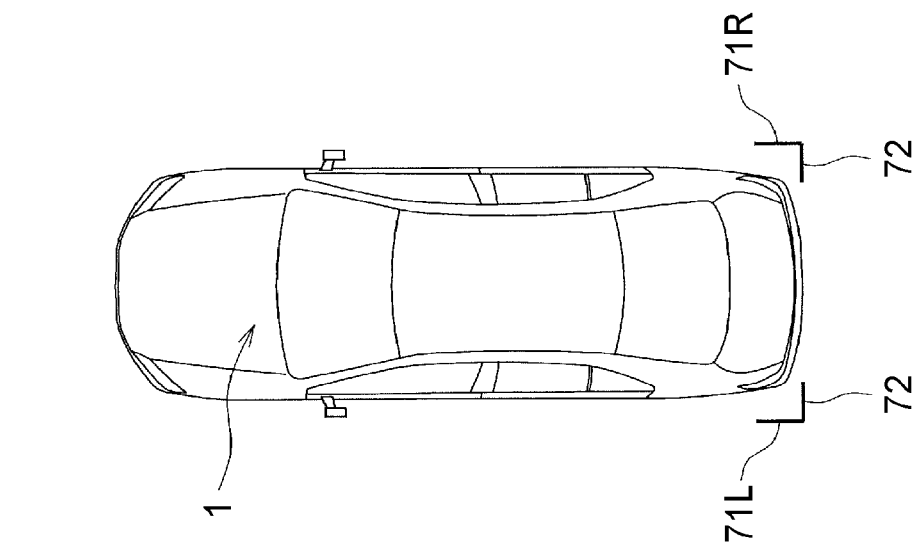
FIG. 30A is a diagram showing a nineteenth embodiment and corresponding to FIG. 5A.

FIG. 30A and FIG. 30B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

In the embodiment, the vehicle-width-directional outermost part display lines 71R, 71L and the vehicle rear edge display line 72 are displayed only at the peripheries of the intersection points of the lines, and the lines are not displayed at the other region.

In the embodiment, it is possible to minimize the area of parts that are hidden by the lines on each of the display devices 41, 42, and it is possible to display nearly the whole of the range from the vehicle lateral direction to the vehicle rearward direction, on each of the display devices 41, 42.

The display manner of the intersection parts of the vehicle-width-direction outermost part display lines 71R, 71L and the vehicle rear edge display line 72 may be a cross form, a T-form, an arc form, a point, an icon indicating the intersection point, or the like, other than the display manner shown in FIG. 30B.

Twentieth Embodiment

Next, a twentieth embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 31:
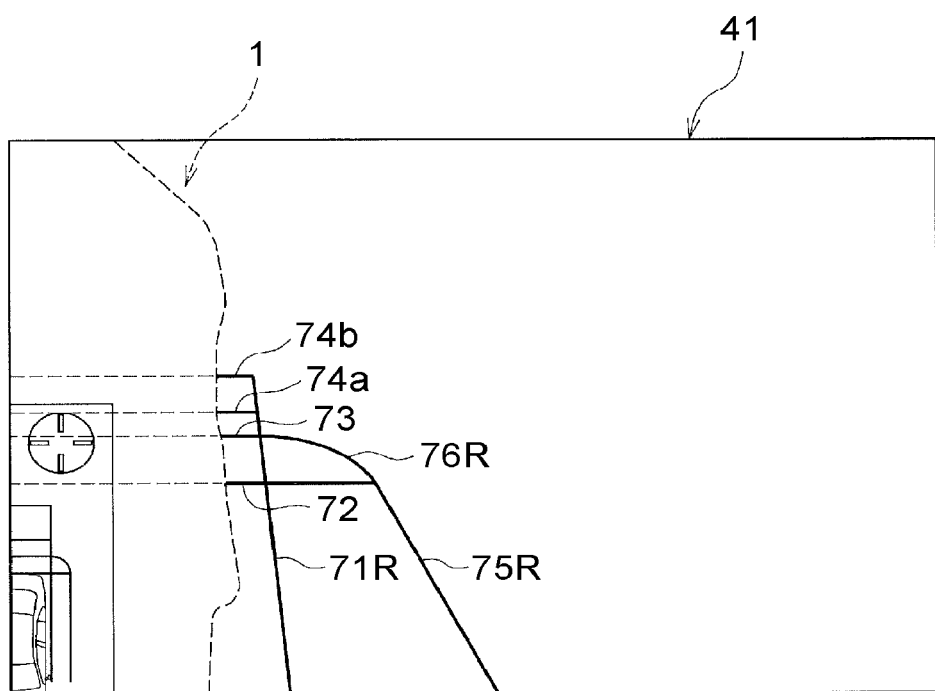
FIG. 31 is a diagram showing a twentieth embodiment and corresponding to FIG. 5B.

FIG. 31 is a diagram for describing the assist image 7 in the embodiment and is a diagram corresponding to FIG. 5B. Also in the embodiment, the display image on the left-side display device 42 is symmetrical to the display image on the right-side display device 41.

In the embodiment, the lines that are displayed on the right-side display device 41 and that extend along the vehicle width direction (the vehicle rear edge display line 72, the vehicle rear edge margin display line 73 and the rearward approach sense increase lines 74a, 74b) are superimposed on the body displayed on the right-side display device 41 and are displayed as broken lines.

The embodiment is effective in grasping the distance sense in the rear of the vehicle 1, and it is possible to recognize a vehicle peripheral region surrounded by the assist image 7.

Twenty-First Embodiment

Next, a twenty-first embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 32A:
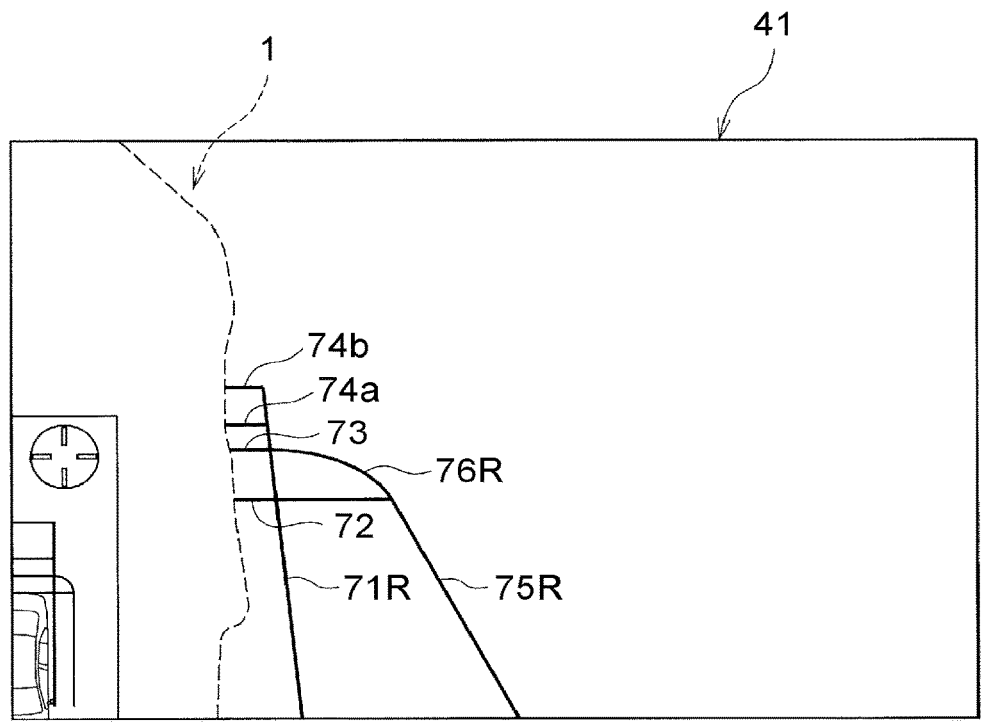
FIG. 32A is a diagram showing a twenty-first embodiment and corresponding to FIG. 5B.
Figure 32B:
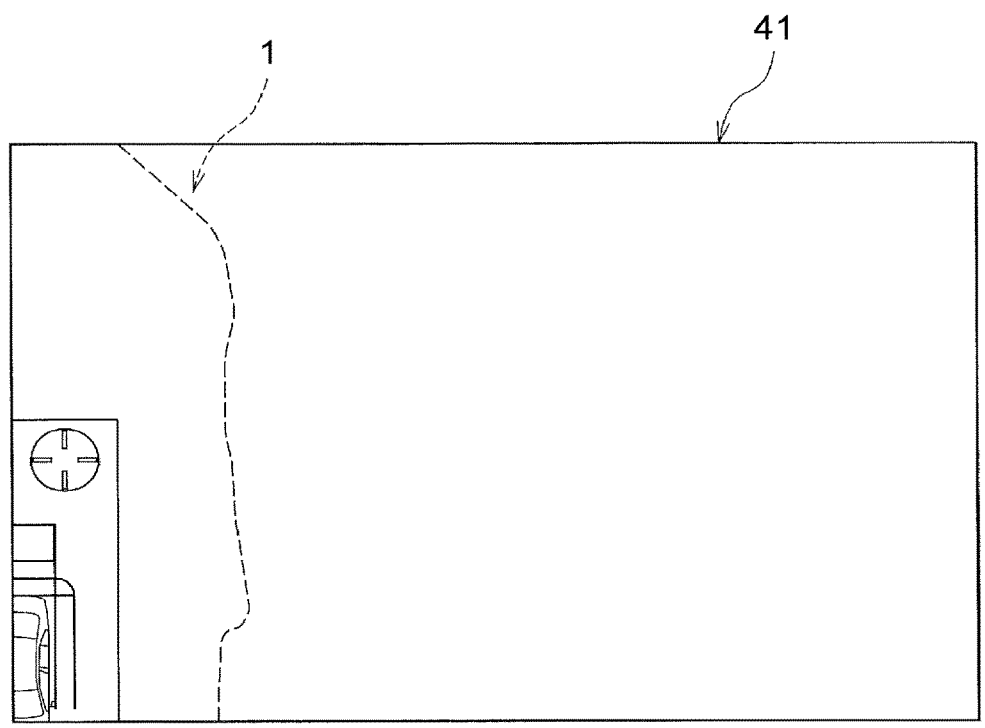
FIG. 32B is a diagram showing the twenty-first embodiment and corresponding to FIG. 5B.

FIG. 32A and FIG. 32B are diagrams for describing the assist image 7 in the embodiment and are diagrams corresponding to FIG. 5B. Also in the embodiment, the display image on the left-side display device 42 is symmetrical to the display image on the right-side display device 41.

In the embodiment, the display image on the right-side display device 41 is switched between an image in which the assist image 7 is displayed and an image in which the assist image 7 is not displayed, by the operation of the operation key image 43a (or the operation of the mirror control switch or the like). FIG. 32A shows the assist image 7 displayed on the right-side display device 41, and shows a display state in the above-described display mode. Meanwhile, FIG. 32B shows a display state in the above-described non-display mode.

Twenty-Second Embodiment

Next, a twenty-second embodiment will be described. Also in the embodiment, the display manner of the assist image 7 is different from that in the first embodiment. The other configuration and behavior are the same as those in the first embodiment, and therefore, only the display manner of the assist image 7 will be described.

Figure 33A:
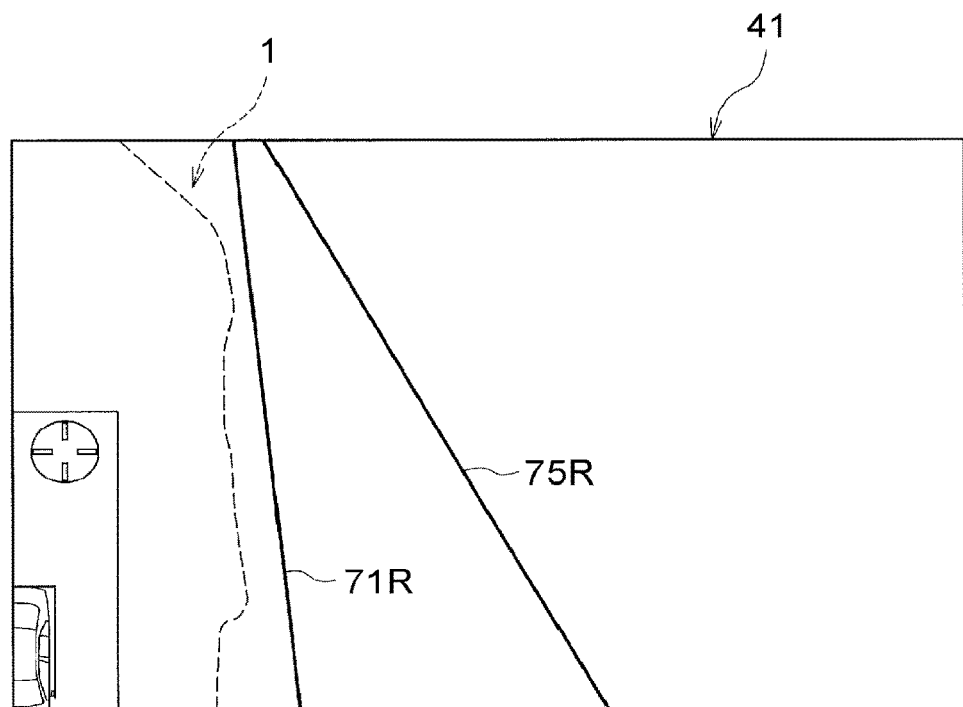
FIG. 33A is a diagram showing a twenty-second embodiment and corresponding to FIG. 5B.
Figure 33B:
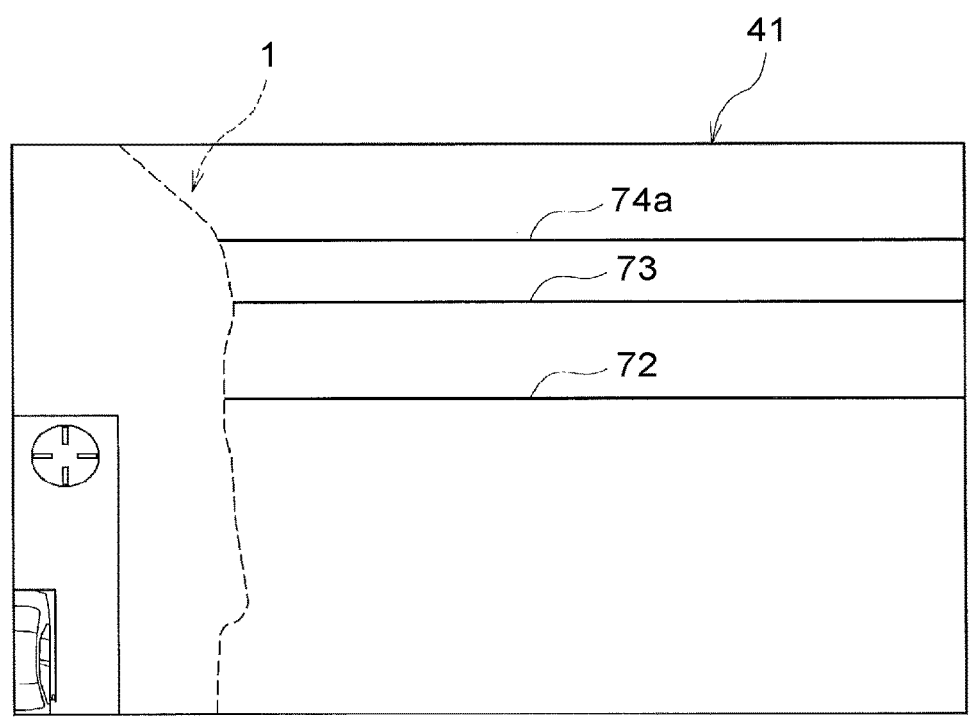
FIG. 33B is a diagram showing the twenty-second embodiment and corresponding to FIG. 5B.

FIG. 33A and FIG. 33B are diagrams for describing the assist image 7 in the embodiment and are diagrams corresponding to FIG. 5B. Also in the embodiment, the display image on the left-side display device 42 is symmetrical to the display image on the right-side display device 41.

In the embodiment, the display image on the right-side display device 41 is switched between a display mode in which only the assist image 7 extending along the vehicle front-rear direction is displayed and a display mode in which only the assist image 7 extending along the vehicle width direction is displayed by the operation of the operation key image 43a (or the operation of the mirror control switch or the like). FIG. 33A shows the assist image 7 displayed on the right-side display device 41, and shows a display state in the above-described display mode in which only the assist image 7 extending along the vehicle front-rear direction is displayed. In FIG. 33A, only the vehicle-width-directional outermost part display line 71R and the lateral distance sense increase line 75R are displayed as the assist image extending along the vehicle front-rear direction. Meanwhile, in FIG. 33B, only the vehicle rear edge display line 72, the vehicle rear edge margin display line 73 and the rearward approach sense increase line 74a are displayed as the assist image extending along the vehicle width direction.

Twenty-Third Embodiment

Next, a twenty-third embodiment will be described. In the embodiment, the line type for displaying the assist image 7 is different from that in the first embodiment. The other configuration and behavior are the same as those in the first embodiment, and therefore, only the display manner of the assist image 7 will be described.

Figure 34:
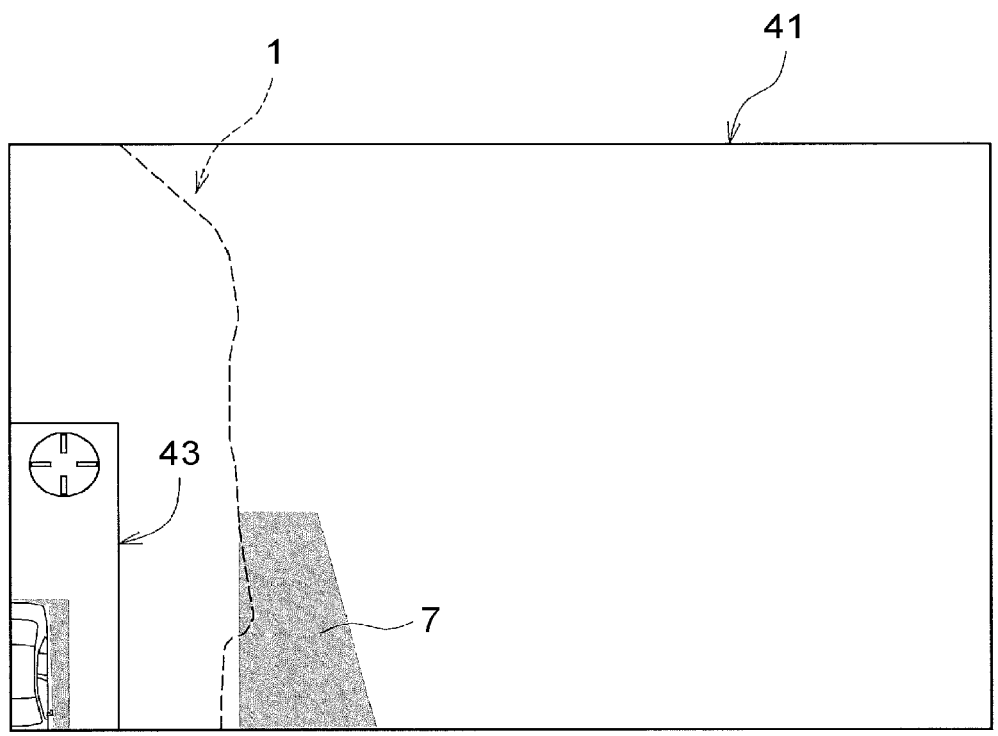
FIG. 34 is a diagram showing a case of a fill display as the assist image and corresponding to FIG. 5B.

In the above-described embodiments, the line type for displaying the assist image 7 is a solid line. The disclosure is not limited to this, and various line types can be selected. For example, the assist image 7 can be displayed as broken lines, dotted lines, transmitting lines, blinking lines, flickering lines, animations and the like. Further, a stereoscopic image may be adopted, or an image in which a blinking spot moves (for example, an image in which a blinking spot formed by broken lines moves to the rear side of the vehicle 1) may be adopted. Further, a fill display of a predetermined region may be adopted as the assist image 7. FIG. 34 shows a display image on the right-side display device 41 in the case of a fill display as the assist image 7. The assist image 7 in the case of the fill display may be an image that hides the backside (background) of the assist image 7, or may be an image (a semitransparent assist image 7) that transmits the backside (background).

Twenty-Fourth Embodiment

Next, a twenty-fourth embodiment will be described. In the embodiment, the display manner of the sub-screen 43 to be displayed on each of the display devices 41, 42 is different from that in the above-described embodiments. The other configuration and behavior are the same as those in the first embodiment, and therefore, only the display manner of the sub-screen 43 will be described.

FIG. 35A and FIG. 35B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 35A and FIG. 35B, in the embodiment, instead of the vehicle planar-view image 43b, a vehicle perspective-view image 43c in which the position of the rear tire is clarified by viewing the vehicle 1 from a diagonal upper side is displayed on the sub-screen 43.

In the embodiment, by watching the sub-screen 43, the driver can easily grasp the position relation between the vehicle 1 and the assist image 7 (particularly, the position relation in the periphery of the rear tire), and can easily recognize the position of the assist image 7.

Twenty-Fifth Embodiment

Next, a twenty-fifth embodiment will be described. Also in the embodiment, the display manner of the sub-screen 43 to be displayed on each of the display devices 41, 42 is different from that in the above-described embodiments. The other configuration and behavior are the same as those in the first embodiment, and therefore, only the display manner of the sub-screen 43 will be described.

Figure 36A:
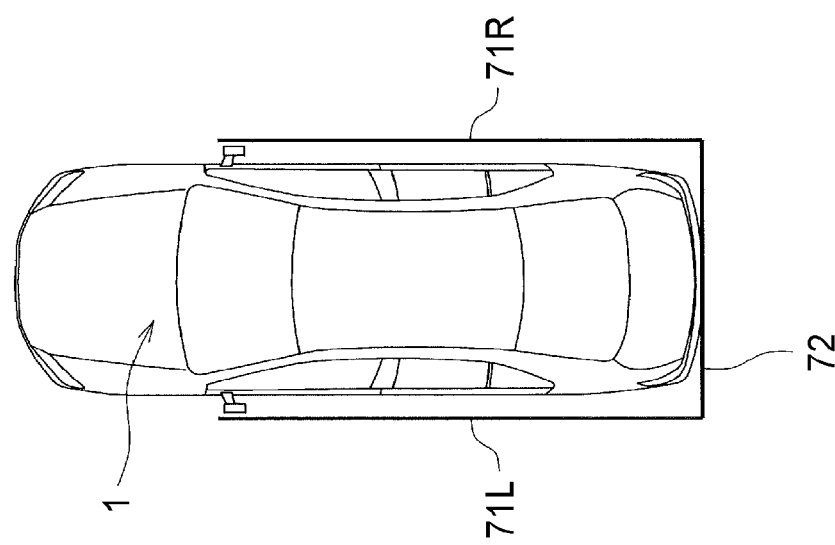
FIG. 36A is a diagram showing a twenty-fifth embodiment and corresponding to FIG. 5A.
Figure 36B:
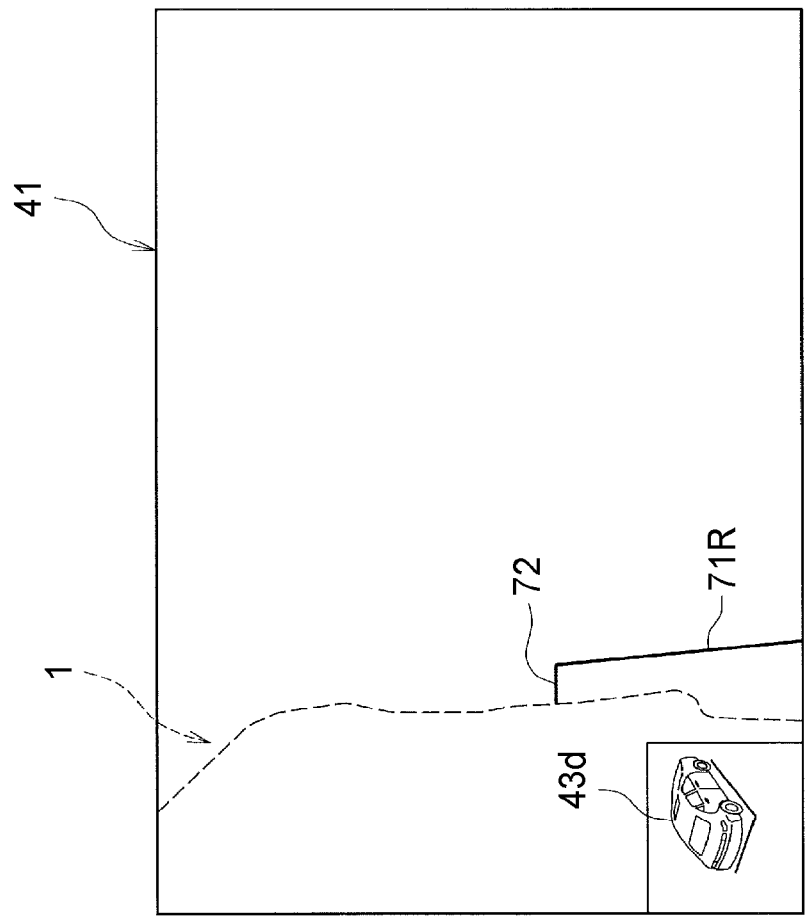
FIG. 36B is a diagram showing the twenty-fifth embodiment and corresponding to FIG. 5B.

FIG. 36A and FIG. 36B are diagrams for describing the assist image 7 in the embodiment and are diagrams corresponding to FIG. 5A and FIG. 5B. Also in the embodiment, the display image on the left-side display device 42 is symmetrical to the display image on the right-side display device 41.

As shown in FIG. 36A and FIG. 36B, in the embodiment, instead of the vehicle planar-view image 43b, a vehicle perspective-view image 43d in which the position relation between the vehicle 1 and the assist image 7 is clarified by viewing the vehicle 1 from a diagonal rear side is displayed on the sub-screen 43.

In the embodiment, by watching the sub-screen 43, the driver can easily grasp the position relation between the vehicle 1 and the assist image 7 (particularly, the position relation on the vehicle rear side), and can easily recognize the position of the assist image 7.

Twenty-Sixth Embodiment

Next, a twenty-sixth embodiment will be described. Also in the embodiment, the display manner of the sub-screen 43 to be displayed on each of the display devices 41, 42 is different from that in the above-described embodiments. Furthermore, a rear side camera is provided at a vehicle rear part. The other configuration and behavior are the same as those in the first embodiment, and therefore, only the display manner of the sub-screen 43 will be described. In the embodiment, instead of the vehicle planar-view image 43b, an image picked up by the rear side camera is displayed on the sub-screen 43. The rear side camera picks up a range from a vehicle rearward direction to a vehicle lateral direction. Also in the embodiment, by watching the sub-screen 43, the driver can easily grasp the position relation between the vehicle 1 and the assist image 7 (the position relation on the vehicle rear side and vehicle lateral side), and can easily recognize the position of the assist image 7.

In the embodiments, the cameras 31, 32 are disposed at the front edge parts of the outer panels of the right and left front-side doors 12, 13, respectively. In the embodiments, a camera may be disposed on a front fender. Further, the electronic mirror apparatus 2 may pick up and display only one of the right and left directions of the vehicle 1, on the display device. That is, for the other, an optical mirror may be adopted.

What is claimed is:

1. An electronic mirror apparatus comprising:
   a camera provided on at least one of a right lateral surface and a left lateral surface of a vehicle, the camera being configured to pick up an image of a predetermined pickup range in a vehicle lateral direction and in a vehicle rearward direction;
   a display device disposed at such a position that a driver visually recognizes the display device; and
   an electronic control unit configured to perform a process for displaying the image picked up by the camera, on the display device, the electronic control unit being configured to display, on the image, an assist image expressing an outer part of a region in which the vehicle occupies a road surface in planar view of the vehicle, wherein
   the outer part of the region in which the vehicle occupies the road surface in the planar view of the vehicle contains a rear edge of the vehicle, and the electronic control unit is configured to display the assist image as a straight line containing a position of the rear edge of the vehicle in the planar view of the vehicle and extending along a vehicle width direction, the position of the rear edge of the vehicle being a position on the road surface when the rear edge of the vehicle is projected on the road surface,
   the outer part of the region in which the vehicle occupies the road surface in the planar view of the vehicle contains an outside edge of the camera in the vehicle width direction, and the electronic control unit is configured to display the assist image as a straight line containing a position of the outside edge of the camera in the vehicle width direction and extending along a vehicle front-rear direction, the position of the outside edge of the camera in the vehicle width direction being a position on the road surface when the outside edge of the camera in the vehicle width direction is projected on the road surface,
   the electronic control unit is configured to acquire position information of a shift lever that is operated by the driver,
   the electronic control unit is configured to display a first image of a first predetermined pickup range in the vehicle lateral direction and in the vehicle rearward direction on the display device when a position of the shift lever is other than a reverse position, and
   the electronic control unit is configured to display the assist image superimposed on a second image of a second predetermined pickup range in the vehicle lateral direction and in the vehicle rearward direction when the position of the shift lever is a reverse position, the second predetermined range being larger than the first predetermined range in at least one of the vehicle lateral direction and the vehicle rearward direction.

2. The electronic mirror apparatus according to claim 1, wherein
   the electronic control unit is configured to display the assist image as a straight line containing a position of a rear side position a predetermined distance away from the rear edge of the vehicle in the planar view of the vehicle and extending along the vehicle width direction, the position of the rear side position being a position on the road surface when the rear side position is projected on the road surface.

3. The electronic mirror apparatus according to claim 1, wherein
   the electronic control unit is configured to display the assist image as a straight line containing a position of an outside position a predetermined distance away from the outside edge of the camera in the vehicle width direction in the planar view of the vehicle and extending along the vehicle front-rear direction, the position of the outside position being a position on the road surface when the outside position is projected on the road surface.

4. The electronic mirror apparatus according to claim 1, wherein
   the electronic control unit is configured to display an image expressing at least a position of a rear end position of a rear wheel of the vehicle, as the assist image, the position of the rear end position being a position on the road surface when the rear end position is projected on the road surface.

5. The electronic mirror apparatus according to claim 1, wherein
   the electronic control unit is configured to acquire steering angle information of a steering wheel of the vehicle, and is configured to change the assist image depending on a vehicle traveling direction corresponding to the acquired steering angle information.

6. The electronic mirror apparatus according to claim 1, wherein
   the electronic control unit is configured to display an image expressing a position of an obstacle when the obstacle exists in the range of the image picked up by the camera, the position of the obstacle being a position on the road surface when the obstacle is projected on the road surface.

7. The electronic mirror apparatus according to claim 1, wherein
   the display device is a touch panel type display device, and the electronic control unit is configured to display an image that is a sign on the road surface, on the image displayed on the display device, in response to a touch panel operation to the display device.

8. The electronic mirror apparatus according to claim 1, wherein
   the electronic control unit is configured to recognize a plurality of markers that is installed on the road surface or is implanted into the road surface, and is configured to display the assist image as a straight line that is obtained when a straight line connecting the markers is projected on the road surface.

9. The electronic mirror apparatus according to claim 1, wherein
   the display device includes a sub-screen on which an overhead image of the vehicle and the assist image is displayed.

10. The electronic mirror apparatus according to claim 1, wherein
    the electronic control unit is configured to switch a display manner of the assist image, in accordance with an operation of a display manner switching input device.

11. The electronic mirror apparatus according to claim 1, wherein
    the outer part of the region is an outermost part of the region.

* * * * *